United States Patent
Fletcher et al.

(10) Patent No.: US 9,828,953 B2
(45) Date of Patent: Nov. 28, 2017

(54) EVACUATOR SYSTEM HAVING MULTI-PORT EVACUATOR

(71) Applicants: David Fletcher, Flint, MI (US); James H. Miller, Ortonville, MI (US); Keith Hampton, Ann Arbor, MI (US); Brian M. Graichen, Leonard, MI (US)

(72) Inventors: David Fletcher, Flint, MI (US); James H. Miller, Ortonville, MI (US); Keith Hampton, Ann Arbor, MI (US); Brian M. Graichen, Leonard, MI (US)

(73) Assignee: Dayco IP Holdings, LLC, Troy, MI (US)

(*) Notice: Subject to any disclaimer, the term of this patent is extended or adjusted under 35 U.S.C. 154(b) by 304 days.

(21) Appl. No.: 14/556,279

(22) Filed: Dec. 1, 2014

(65) Prior Publication Data

US 2016/0153472 A1 Jun. 2, 2016

(51) Int. Cl.
| | |
|---|---|
| F04D 19/00 | (2006.01) |
| F02M 25/08 | (2006.01) |
| F04D 21/00 | (2006.01) |
| F04D 19/04 | (2006.01) |
| F02M 35/10 | (2006.01) |

(Continued)

(52) U.S. Cl.
CPC ......... *F02M 25/0854* (2013.01); *B60T 17/02* (2013.01); *F01M 13/022* (2013.01); *F02M 25/06* (2013.01); *F02M 25/0872* (2013.01); *F02M 35/10157* (2013.01); *F02M 35/10222* (2013.01); *F02M 35/10229* (2013.01); *F04D 19/00* (2013.01); *F04D 19/04* (2013.01); *F04D 21/00* (2013.01); *F04F 5/20* (2013.01); *F04F 5/466* (2013.01); *F02B 37/00* (2013.01); *Y02T 10/121* (2013.01); *Y02T 10/144* (2013.01)

(58) Field of Classification Search
CPC .......... F02D 19/00; F02D 19/04; F04D 19/04; F04D 21/00
See application file for complete search history.

(56) References Cited

U.S. PATENT DOCUMENTS

| | | |
|---|---|---|
| 1,845,969 A | 2/1932 | Hueber |
| 3,234,932 A | 2/1966 | Bird et al. |

(Continued)

FOREIGN PATENT DOCUMENTS

| | | |
|---|---|---|
| CN | 201109426 | 9/2008 |
| CN | 103407441 | 11/2013 |

(Continued)

OTHER PUBLICATIONS

U.S., Non-Final Office Action; U.S. Appl. No. 14/556,292; (dated May 6, 2016).

(Continued)

*Primary Examiner* — Erick Solis
(74) *Attorney, Agent, or Firm* — FisherBroyles, LLP; Susan M. Oiler

(57) ABSTRACT

A pneumatically actuated vacuum pump is disclosed. The pneumatically actuated vacuum pump includes a body. The body defines at least two converging motive sections each having an outlet end, at least two diverging discharge sections each having an inlet end, and at least one Venturi gap. The Venturi gap is located between the outlet ends of the at least two converging motive sections and the inlet ends of the at least two diverging discharge sections.

21 Claims, 14 Drawing Sheets

(51) Int. Cl.
  *F02M 25/06* (2016.01)
  *F01M 13/02* (2006.01)
  *B60T 17/02* (2006.01)
  *F04F 5/20* (2006.01)
  *F04F 5/46* (2006.01)
  *F02B 37/00* (2006.01)

(56) References Cited

U.S. PATENT DOCUMENTS

| | | |
|---|---|---|
| 3,635,601 A | 1/1972 | Larson et al. |
| 3,754,841 A | 8/1973 | Grabb et al. |
| 4,211,200 A | 7/1980 | Rocchio et al. |
| 4,404,805 A | 9/1983 | Curtil |
| 4,499,034 A | 2/1985 | McAllister |
| 4,519,423 A | 5/1985 | Ho et al. |
| 4,530,210 A | 7/1985 | Yamazaki |
| 4,554,786 A | 11/1985 | Takeuchi et al. |
| 5,080,078 A | 1/1992 | Hamburg |
| 5,108,266 A | 4/1992 | Hewitt |
| 5,188,141 A | 2/1993 | Cook et al. |
| 5,291,916 A | 3/1994 | Kloosterman et al. |
| 5,816,446 A | 10/1998 | Steindorf et al. |
| 6,035,881 A | 3/2000 | Emmerich et al. |
| RE37,090 E | 3/2001 | Kloosterman et al. |
| 6,220,271 B1 | 4/2001 | Emmerich et al. |
| 6,732,524 B2 | 5/2004 | Sponton |
| 7,722,132 B2 | 5/2010 | Carlsson |
| 7,854,118 B2 | 12/2010 | Vetrovec |
| 7,905,218 B2 | 3/2011 | Fornara et al. |
| 8,413,641 B2 | 4/2013 | Fornara et al. |
| 2004/0237946 A1 | 12/2004 | Murakami et al. |
| 2005/0061378 A1 | 3/2005 | Foret |
| 2006/0016477 A1 | 1/2006 | Zaparackas |
| 2008/0007113 A1 | 1/2008 | Choi |
| 2008/0121480 A1 | 5/2008 | Kawamori et al. |
| 2011/0120432 A1 | 5/2011 | Ulrey et al. |
| 2011/0132311 A1 | 6/2011 | Pursifull et al. |
| 2011/0186151 A1 | 8/2011 | Sparazynski |
| 2013/0101412 A1* | 4/2013 | Mitsuhashi ......... F04C 18/3441 415/220 |
| 2013/0213510 A1 | 8/2013 | Burnham et al. |
| 2013/0220282 A1 | 8/2013 | Hadre et al. |
| 2013/0233276 A1 | 9/2013 | Pursifull et al. |
| 2013/0233287 A1 | 9/2013 | Leone |
| 2014/0116399 A1 | 5/2014 | Ulrey et al. |
| 2014/0165931 A1* | 6/2014 | Pursifull ......... F02M 35/10229 123/2 |
| 2014/0360607 A1 | 12/2014 | Fletcher et al. |
| 2015/0114348 A1 | 4/2015 | Pursifull et al. |
| 2015/0114350 A1 | 4/2015 | Pursifull |
| 2015/0204283 A1* | 7/2015 | VanDerWege ... F02M 35/10144 123/445 |

FOREIGN PATENT DOCUMENTS

| | | |
|---|---|---|
| DE | 4310761 | 10/1994 |
| GB | 2129516 | 5/1984 |
| JP | 2007-327453 | 12/2007 |

OTHER PUBLICATIONS

PCT, International Search Report and Written Opinion, PCT/US2014/041250 (dated Oct. 27, 2014).
CN, Office Action and Search Report with English translation; Chinese Patent Application No. 201410413220.7; (dated Nov. 14, 2016).
U.S., Non-Final Office Action; U.S. Appl. No. 14/294,727; (dated Oct. 8, 2015).
U.S., Final Office Action; U.S. Appl. No. 14/294,727; (dated Apr. 22, 2016).
PCT, International Search Report and Written Opinion, PCT/US2015/061488, (dated Feb. 1, 2016).
PCT, International Search Report and Written Opinion, PCT/US2015/061489, (dated Feb. 2, 2016).
U.S., Notice of Allowance; U.S. Appl. No. 14/556,292; (dated Oct. 21, 2016).
CN, First Office Action and Search Report with English translation; Patent Application No. 2015800003002; 11 pages (dated Apr. 6, 2017).
EP, Supplementary European Search Report; Patent Application No. 14811266.7; 5 pages (dated Apr. 5, 2017).

* cited by examiner

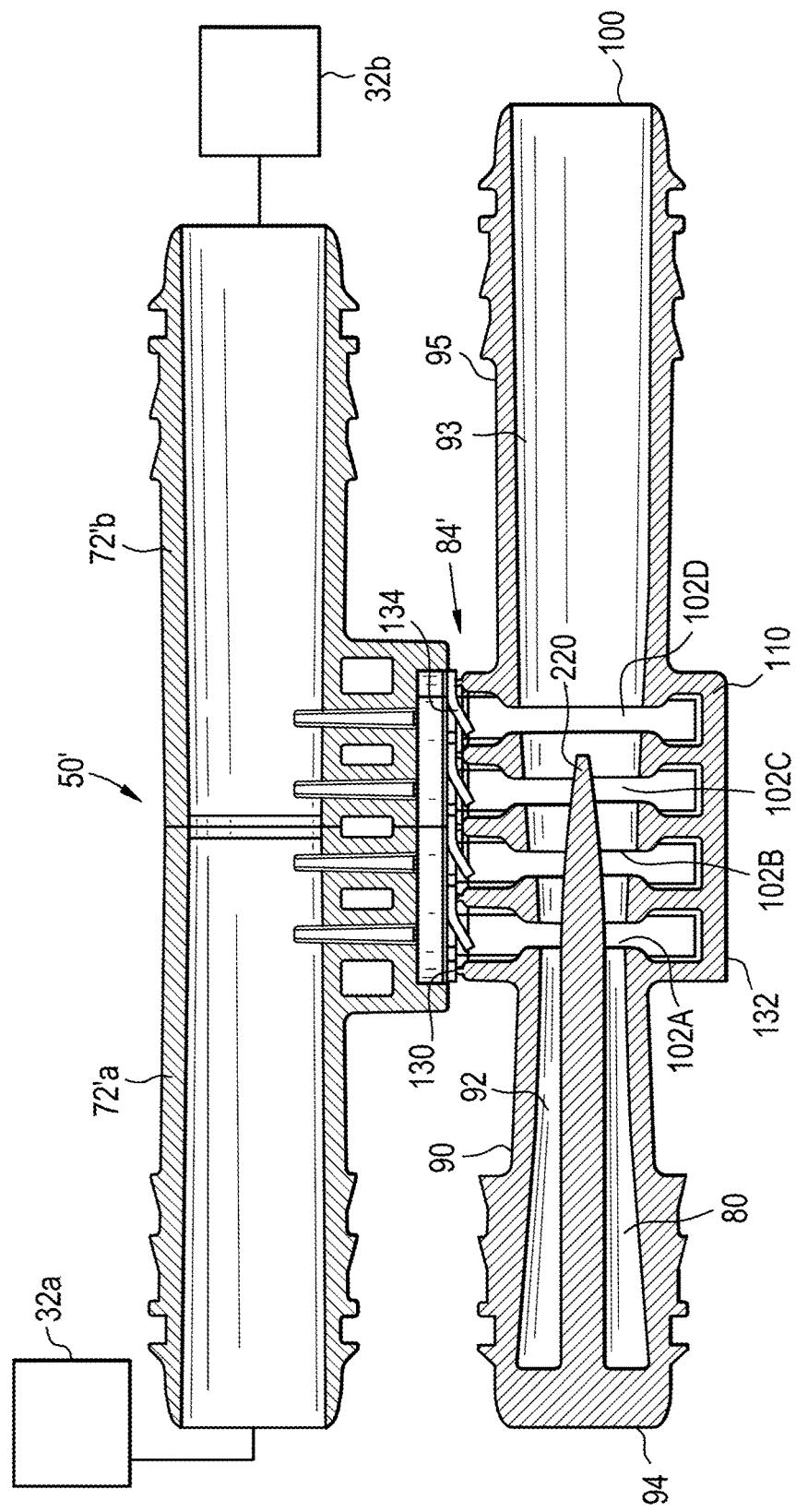

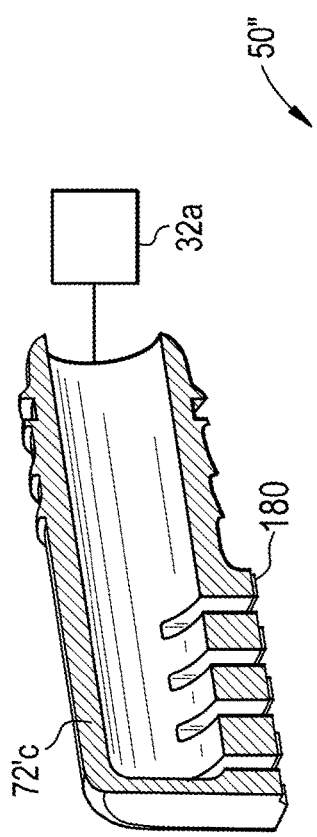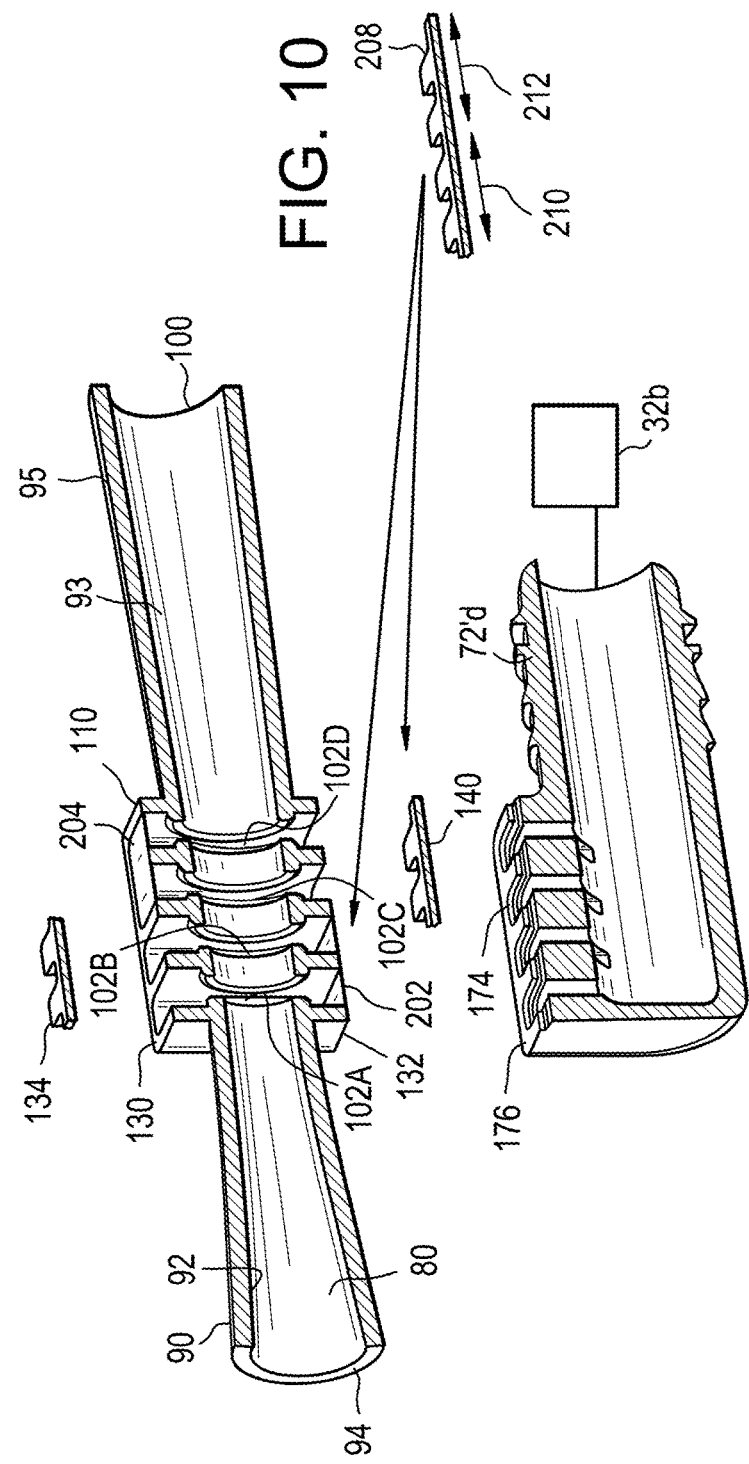

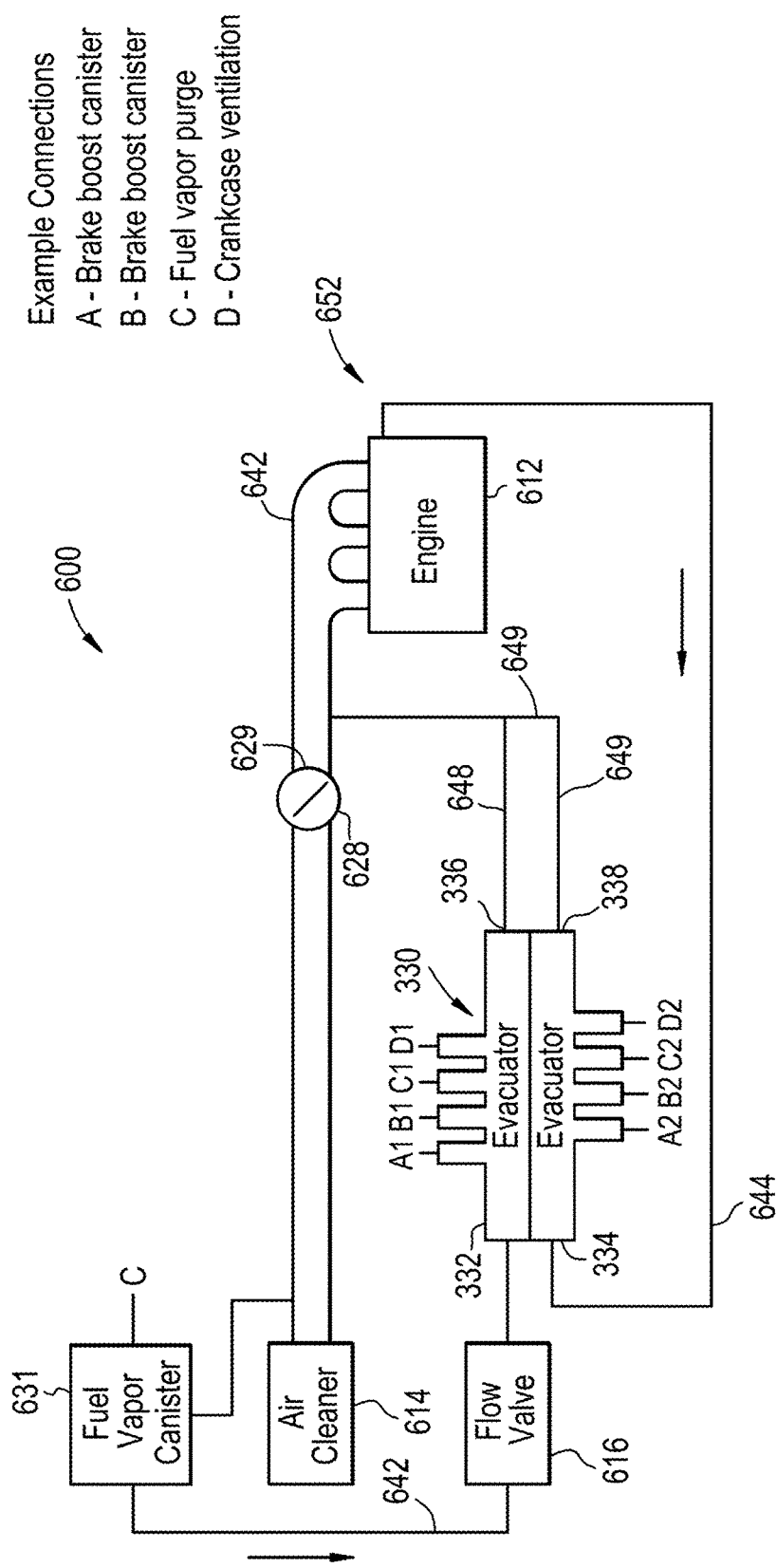

EVACUATOR SYSTEM HAVING MULTI-PORT EVACUATOR

TECHNICAL FIELD

This application relates to an operating system generating vacuum using an evacuator, and in particular to an evacuator including multiple motive and discharge ports that provides different characteristics of suction vacuum and suction flow rates.

BACKGROUND

In some vehicles, vacuum is used to operate or assist in the operation of various devices. For example, vacuum may be used to assist a driver applying vehicle brakes, turbocharger operation, fuel vapor purging, heating and ventilation system actuation, and driveline component actuation. If the vehicle does not produce vacuum naturally, such as from the intake manifold, then a separate vacuum source is required to operate such devices. For example, in some boosted engines where intake manifold pressures are often at pressures greater than atmospheric pressure, intake manifold vacuum may be replaced or augmented with vacuum from an evacuator.

As used herein, an evacuator is defined as a converging, diverging nozzle assembly with three connections, a motive port, a discharge port, and a suction port connected to a device requiring vacuum. The evacuator may be an ejector or an aspirator, depending on the pressures at the motive and discharge ports. Specifically, if the pressure at the motive port of the evacuator is at atmospheric pressure and if the discharge port is less than atmospheric pressure, then the evacuator may operate as an aspirator. If the pressure at the motive port of the evacuator is greater than atmospheric pressure and the discharge port of the evacuator is less than the pressure at the motive port but at least atmospheric pressure, then the evacuator operates as an ejector. A low pressure region may be created within the evacuator so that air can be drawn from a vacuum reservoir or may directly act on a device requiring vacuum, thereby reducing pressure within the vacuum reservoir or device requiring vacuum.

Those skilled in the art readily understand that the various vacuum consuming devices in a vehicle typically include different requirements for suction vacuum as well as suction flow rate. For example, a fuel vapor purge canister produces a continuous flow requiring a relatively low level of vacuum over a longer period of time when compared to a brake boost canister. However, the brake boost canister typically requires relatively higher suction vacuum when compared to the fuel vapor purge canister. Moreover, a crankcase ventilation system needs to be purged continuously, and therefore requires a constant supply of vacuum. In contrast, the fuel vapor purge canister may only need purging for a specified period of time after starting of the vehicle.

Some existing vehicles may supply vacuum to each of the devices requiring vacuum (i.e., the brake boost canister, fuel vapor purge canister, etc.) separately. This current approach for providing vacuum results in an increased number of parts, complexity, and cost to the vehicle. Thus, there is a continuing need in the art for an improved, low-cost approach for providing both high suction vacuum and high suction flow rate to multiple vacuum consuming devices within a vehicle.

SUMMARY

In one embodiment, a pneumatically actuated vacuum pump is disclosed. The pneumatically actuated vacuum pump includes a body. The body defines at least two converging motive sections each having an outlet end, at least two diverging discharge sections each having an inlet end, and at least one Venturi gap. The Venturi gap is located between the outlet ends of the at least two converging motive sections and the inlet ends of the at least two diverging discharge sections.

In another embodiment, a turbocharged engine air system is disclosed. The turbocharged engine air system includes at least two devices requiring vacuum, a turbocharger having a compressor fluidly connected to an intake manifold of an engine, and an evacuator. The evacuator defines at least two motive sections, at least two discharge sections, and at least two suction ports. The at least two discharge sections of the evacuator are fluidly connected to the intake manifold of the engine at a location downstream of the compressor, and each of the at least two suction ports of the evacuator are fluidly connected to one of the at least two devices requiring vacuum.

In yet another embodiment, a normally aspirated engine air system including an engine and a throttle located upstream of an intake manifold of the engine is disclosed. The system includes at least two devices requiring vacuum and an evacuator. The evacuator defines at least two motive sections, at least two discharge sections, and at least two suction ports. The at least two discharge sections are fluidly connected to the intake manifold of the engine at a location downstream of the throttle, and each of the at least two suction ports are fluidly connected to one of the at least two devices requiring vacuum.

BRIEF DESCRIPTION OF THE DRAWINGS

FIG. 8 is a longitudinal cross-sectional view of another embodiment of an evacuator.

FIG. 9 is an exploded, longitudinal cross-sectional view of one embodiment of an evacuator.

FIG. 10 is an illustration of a check valve element for use in the evacuator shown in FIG. 9.

FIG. 15 a schematic diagram including flow paths and flow directions of a normally aspirated internal combustion engine system including the evacuator shown in any of FIG. 11 or 14.

DETAILED DESCRIPTION

Figure 1:
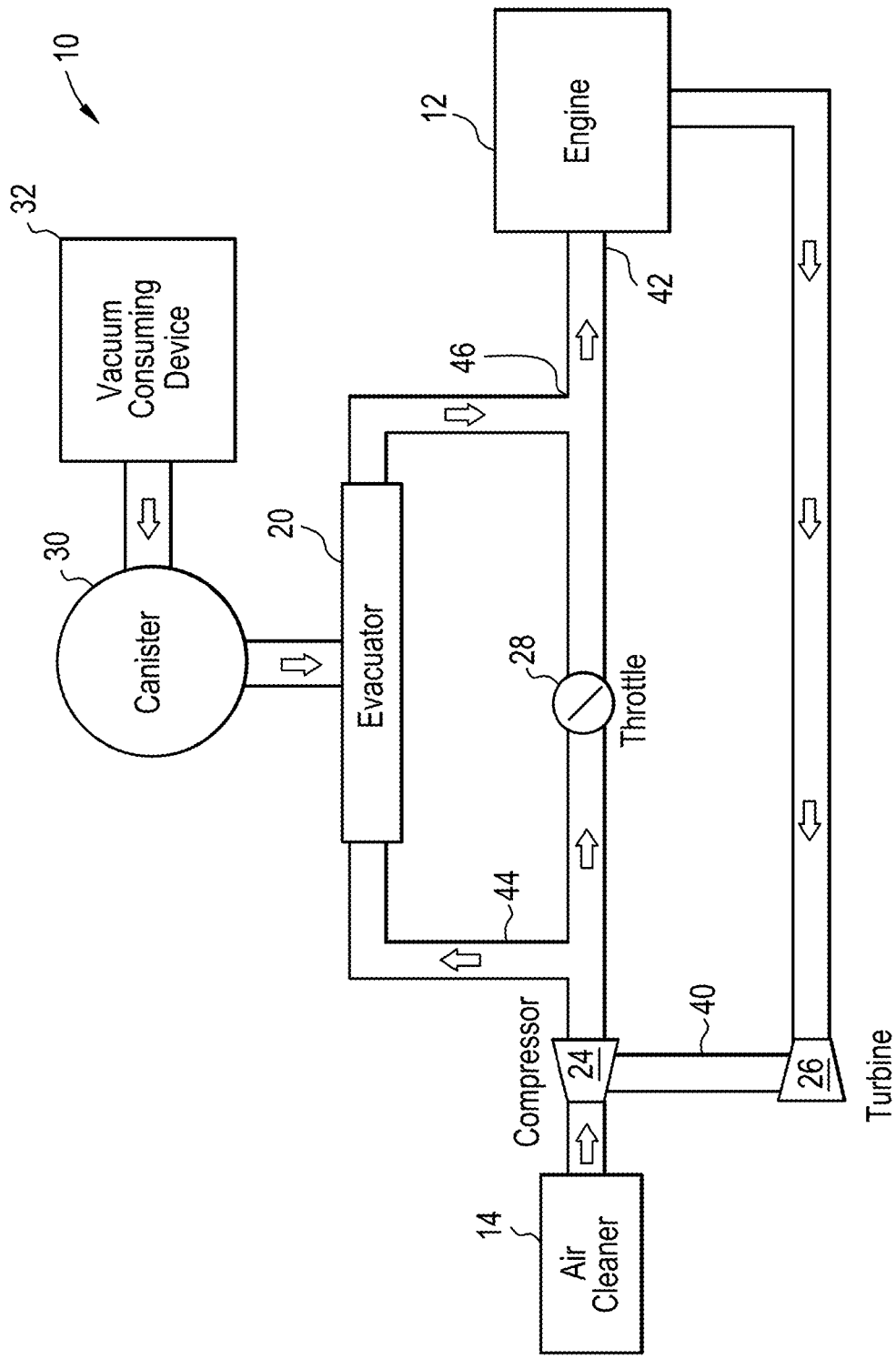
FIG. 1 is a schematic diagram including flow paths and flow directions of one embodiment of an internal combustion engine turbo system including an evacuator.

The following detailed description will illustrate the general principles of the invention, examples of which are additionally illustrated in the accompanying drawings. In the drawings, like reference numbers indicate identical or functionally similar elements. As used herein, the term fluid may include any liquid, suspension, colloid, gas, plasma, or combinations thereof.

Referring now to FIG. 1, an exemplary turbocharged engine air system 10 for providing vacuum to a vehicle vacuum system is disclosed. The engine air system 10 may include an internal combustion engine 12, an air cleaner 14, an evacuator 20, a compressor 24, a turbine 26, a throttle 28, a vacuum reservoir or canister 30, and a vacuum consuming device 32. The internal combustion engine 12 may be, for example, a spark ignited (SI) engine or a compression ignition (CI) engine. In one embodiment, the internal combustion engine 12 may be included in an electric motor/battery system that is part of a hybrid vehicle. In the embodiment as shown in FIG. 1, the internal combustion engine 12 is boosted. This means that the compressor 24 and turbine 26 may be part of a turbocharger for improving the power output and overall efficiency of the internal combustion engine 12. The turbine 26 may include a turbine wheel (not illustrated in FIG. 1) that harnesses and converts exhaust energy into mechanical work through a common shaft 40 to turn a compressor wheel (not illustrated in FIG. 1) of the compressor 24. The compressor wheel ingests, compresses, and feeds air at elevated operating pressures into the intake manifold 42 of the internal combustion engine 12.

The vacuum canister 30 may be supplied vacuum from the evacuator 20. The evacuator 20 is supplied air from the compressor 24. Specifically, clean air at atmospheric pressure exits the air cleaner 14 and may be compressed by the compressor 24 before passing through the evacuator 20. As explained in greater detail below, the evacuator 20 may be used to supply vacuum to the vacuum canister 30. In particular, the amount of vacuum supplied by the evacuator 20 may be adjusted based on the specific operating conditions of the engine air system 10, which is explained in greater detail below.

The throttle 28 may be located downstream of the air cleaner 14 and the compressor 24, and upstream of an intake manifold 42 of the internal combustion engine 12. The throttle 28 may be opened as an operator depresses upon an accelerator pedal (not shown). When the throttle 28 is opened, compressed air from the compressor 24 is free to fill the intake manifold 42 of the internal combustion engine 12, thereby increasing the pressure at the intake manifold 42. Those skilled in the art will appreciate that the throttle 28 may be positioned in a plurality of partially opened positions based on the amount of depression of the accelerator (not shown). Since the engine air system 10 is turbocharged, the pressure at the intake manifold 42 may increase to a pressure that is above atmosphere as the throttle 28 is opened.

Figure 2:
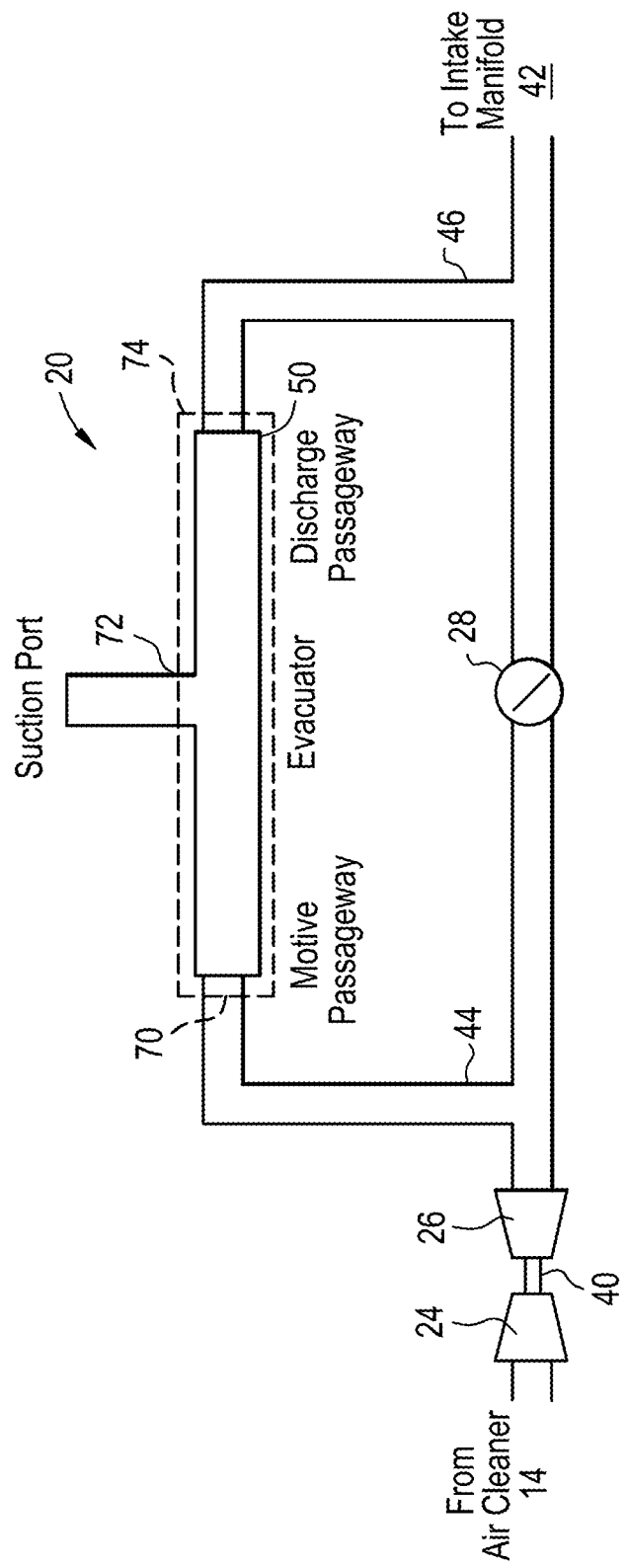
FIG. 2 is a schematic diagram of the evacuator shown in FIG. 1.

The evacuator 20 may include a first engine air connection 44, a second engine air connection 46, and a pneumatically actuated vacuum pump 50 that is shown in FIG. 2. The engine air connection 44 of the evacuator 20 may be fluidly connected to the engine air system 10 at a location upstream of the throttle 28 and downstream of the compressor 24. The engine air connection 46 of the evacuator 20 may be fluidly connected to the engine air system 10 at a location upstream of the intake manifold 42 and downstream of the throttle 28. The pneumatically actuated vacuum pump 50 may be used to supply vacuum to the vacuum canister 30. Specifically, the amount of vacuum supplied by the pneumatically actuated vacuum pump 50 may be adjusted based on the specific operating conditions of the engine air system 10, and is explained in greater detail below. Although the evacuator 20 is illustrated as supplying vacuum to the vacuum canister 30, those skilled in the art will appreciate that in an alternative embodiment, the evacuator 20 may directly supply vacuum to the vacuum consuming device 32.

The vacuum consuming device 32 may be a device requiring vacuum, such as a brake booster. In an embodiment, the vacuum consuming device 32 may also include additional vacuum consumers as well such as, for example, turbocharger waste gate actuators, heating and ventilation actuators, driveline actuators (e.g., four wheel drive actuators), fuel vapor purging systems, engine crankcase ventilation, and fuel system leak testing systems.

FIG. 2 is a schematic diagram of one embodiment of the evacuator 20 shown in FIG. 1, and illustrates the pneumatically actuated vacuum pump 50. The pneumatically actuated vacuum pump 50 may act as either an aspirator or an ejector depending on the pressure at the intake manifold 42. Specifically, an aspirator is an evacuator with its motive fixed at atmospheric pressure and its discharge at below atmospheric pressure. An ejector is an evacuator with its motive pressure at above atmospheric pressure, and its discharge fixed at atmospheric pressure.

Referring to FIGS. 1-2, as used herein, the pneumatically actuated vacuum pump 50 may be a converging, diverging nozzle assembly with three or more connections. The pneumatically actuated vacuum pump 50 may include a motive port 70 fluidly connected to the engine air connection 44, a discharge port 74 fluidly connected to the engine air connection 46, and one or more suction ports 72 fluidly connected to the vacuum canister 30 or to one or more devices requiring vacuum 32. When a plurality of suction ports 72 are present as shown in a first embodiment in FIG. 3 and in a second embodiment in FIG. 8 and a third embodiment in FIG. 9, the suction ports 72' may be collectively connected to the same device requiring vacuum 32 or the same vacuum canister 30 or may be individually connected to different devices requiring vacuum 32a and 32b, including the vacuum canister 30 as one possible device requiring vacuum.

Specifically, the motive port 70 of the aspirator 50 may be fluidly connected to the engine air system 10 downstream of the compressor 24, and the discharge port 74 of the aspirator 50 may be fluidly connected to the engine air system 10 upstream of the intake manifold 42. Those skilled in the art will readily appreciate that since the evacuator 20 is connected to the engine air system 10 downstream of the compressor 24, this usually eliminates the need for a check valve between the compressor 24 and the motive port 70 of the pneumatically actuated vacuum pump 50. This is because the pressure at the engine air connection 44, which is upstream of the throttle 28, should always be greater than the pressure at the engine air connection 46, which is downstream of the throttle 28.

Figure 3:
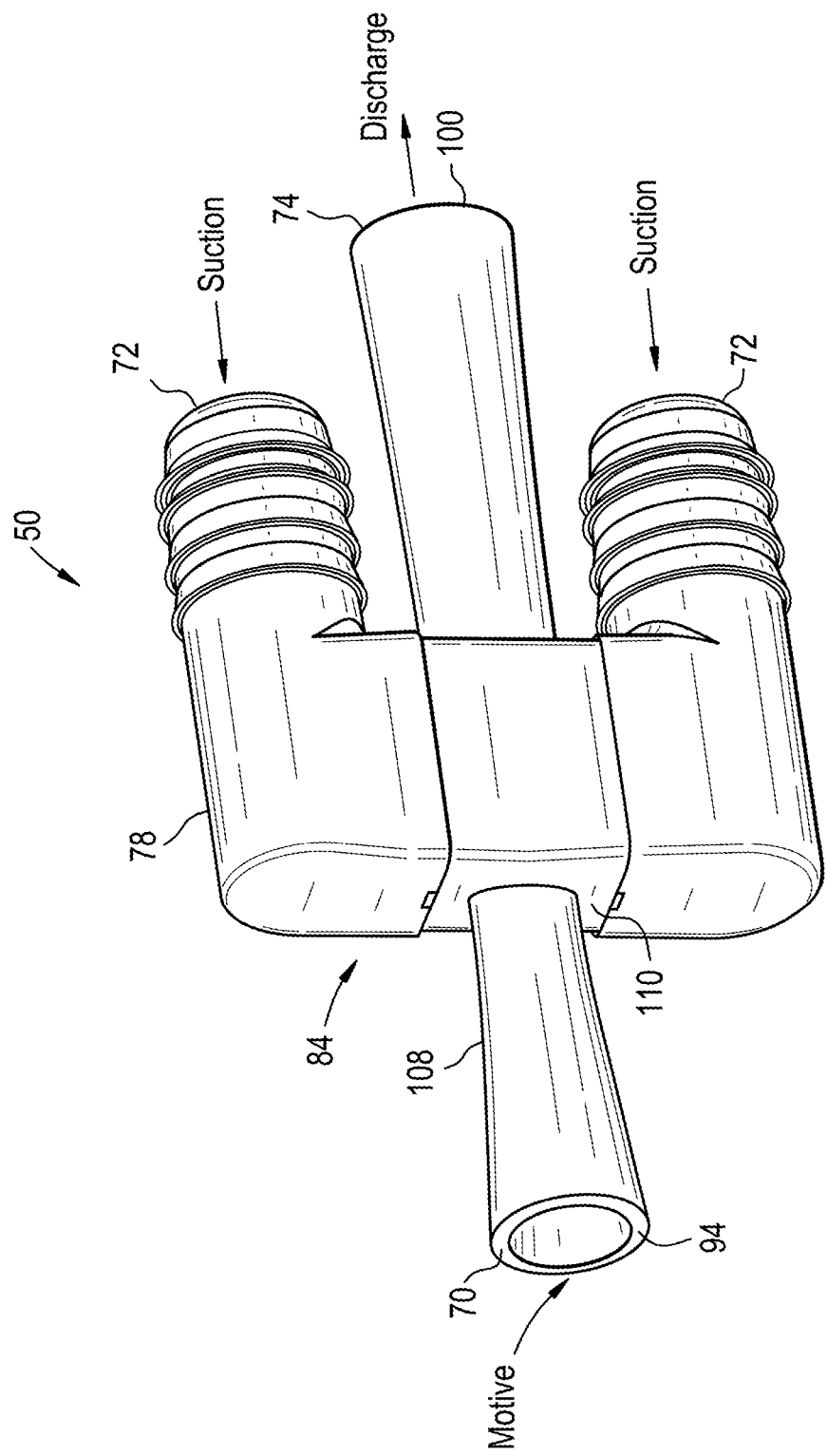
FIG. 3 is a perspective view of the evacuator in FIG. 2.
Figure 4:
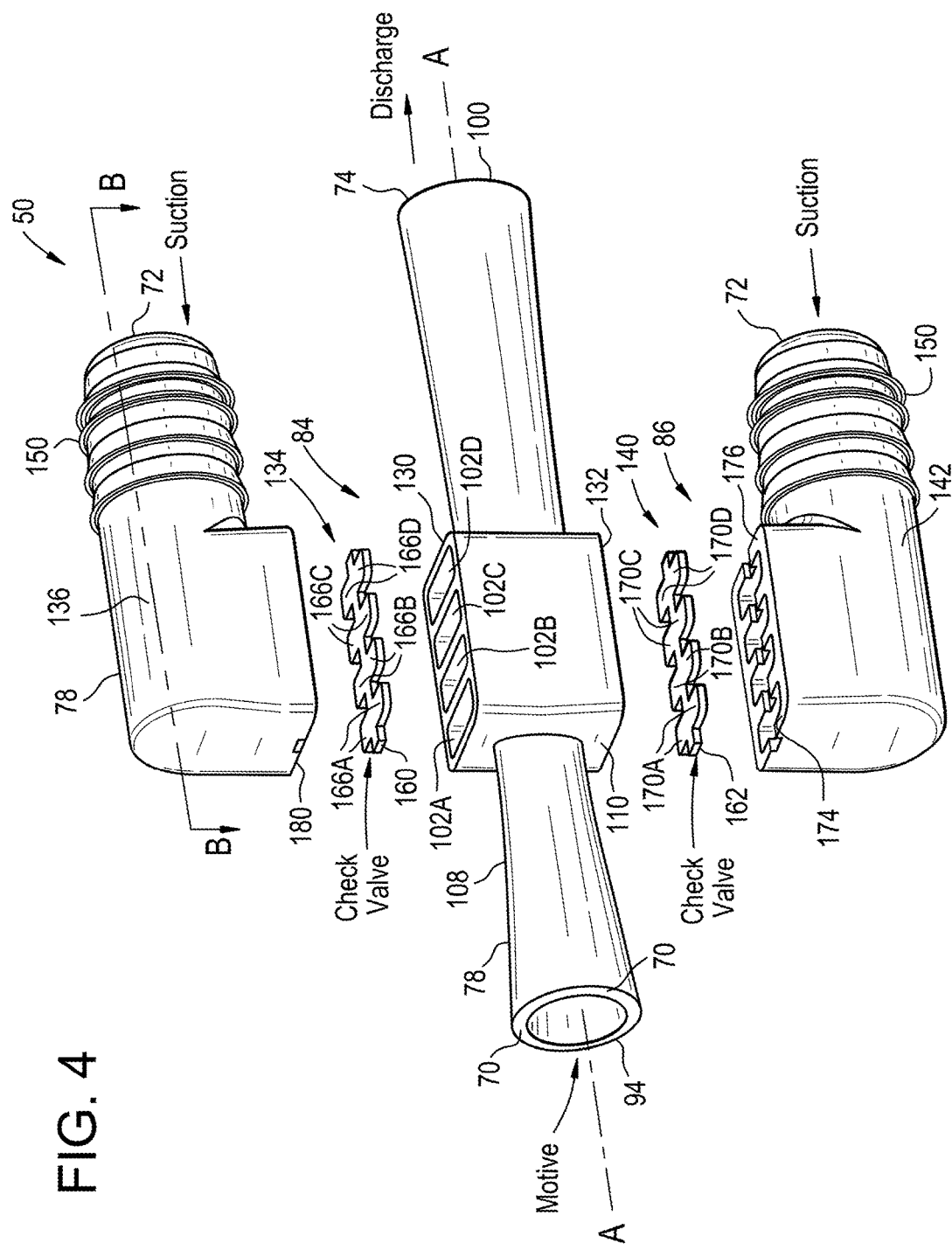
FIG. 4 is an exploded view of the evacuator shown in FIG. 3.
Figure 5:
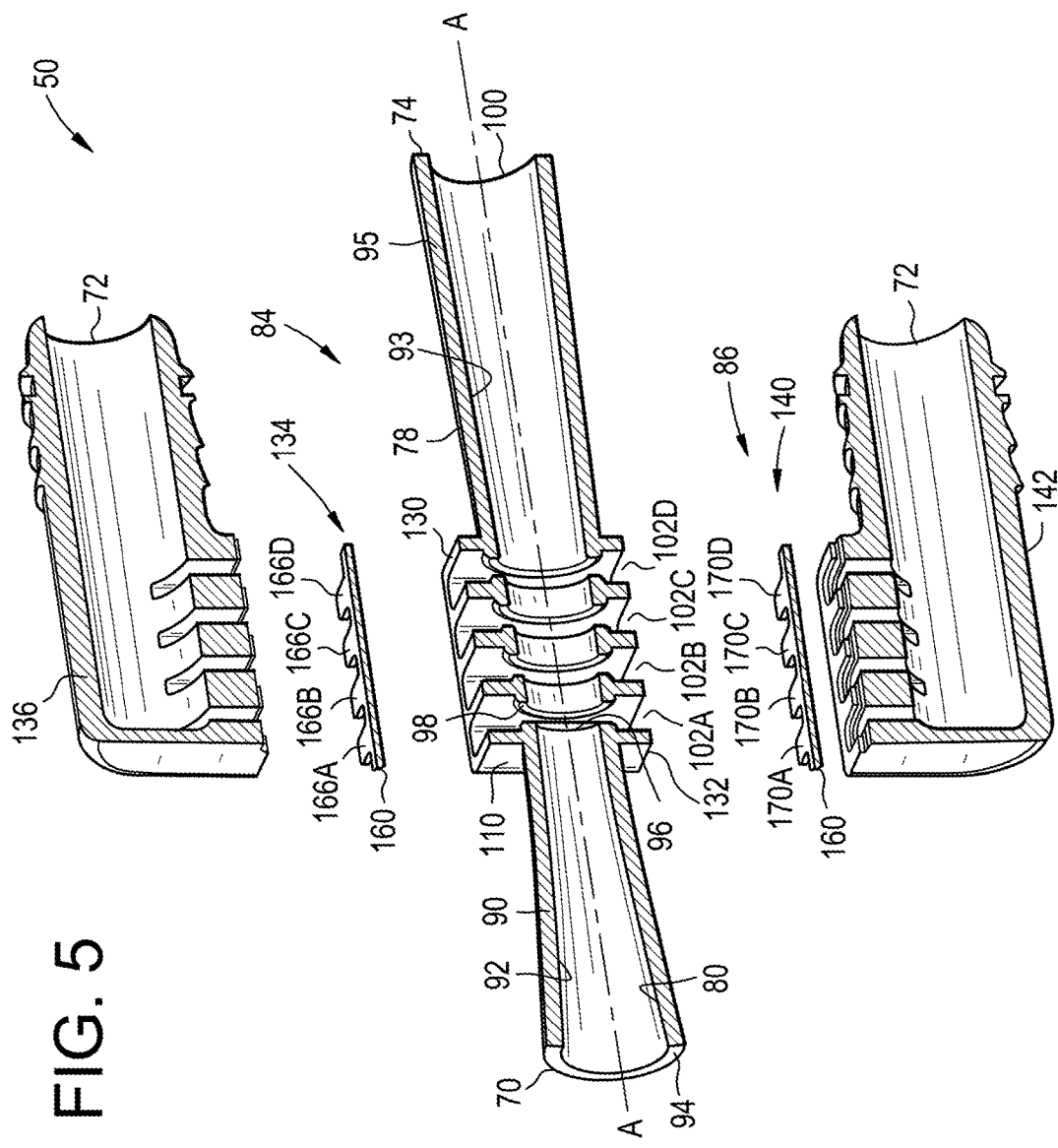
FIG. 5 is an exploded view of the evacuator shown in FIG. 2, taken along section line B-B in FIG. 4.

FIG. 3 is a perspective view of the pneumatically actuated vacuum pump 50, FIG. 4 is an exploded view of the pneumatically actuated vacuum pump 50 shown in FIG. 3, and FIG. 5 is a sectioned view of the exploded pneumatically actuated vacuum pump 50 shown in FIG. 4. Referring to FIGS. 3-5, a body 78 of the pneumatically actuated vacuum pump 50 may define a passageway 80 (shown in FIG. 5) that extends along an axis A-A. In the embodiment as illustrated in FIG. 3-5, the body 78 of the pneumatically actuated vacuum pump 50 includes four ports that are connectable to subsystems of the internal combustion engine 12 (FIG. 1). Specifically, the pneumatically actuated vacuum pump 50 may include the motive port 70, the discharge port 74, and two suction ports 72. In the non-limiting embodiment as shown, the pneumatically actuated vacuum pump 50 includes two suction ports 72, where one of the suction ports 72 is located along a top portion 84 of the pneumatically actuated vacuum pump 50 and the remaining suction port 72 is located along a bottom portion 86 of the pneumatically actuated vacuum pump 50. However, it is to be understood that in another embodiment only one suction port 72 located along either the top portion 84 or the bottom portion 86 of the pneumatically actuated vacuum pump 50 may be used as well. Or in another embodiment, as shown in FIG. 8, the two suctions ports 72' may both be disposed along a top portion 84' of the pneumatically actuated vacuum pump 50', as will be described in more detail below.

Referring to FIG. 5, the passageway 80 of the pneumatically actuated vacuum pump 50 may include a first tapering portion 92 (also referred to as a motive cone) in a motive section 90 of the passageway 80. The passageway 80 may also include a second tapering portion 93 (also referred to as a discharge cone) in a discharge section 95 of the passageway 80. The first tapering portion 92 of the passageway 80 may include an inlet end 94 and an outlet end 96. Similarly, the second tapering portion 93 of the passageway 80 may also include an inlet end 98 and an outlet end 100.

Figure 6:
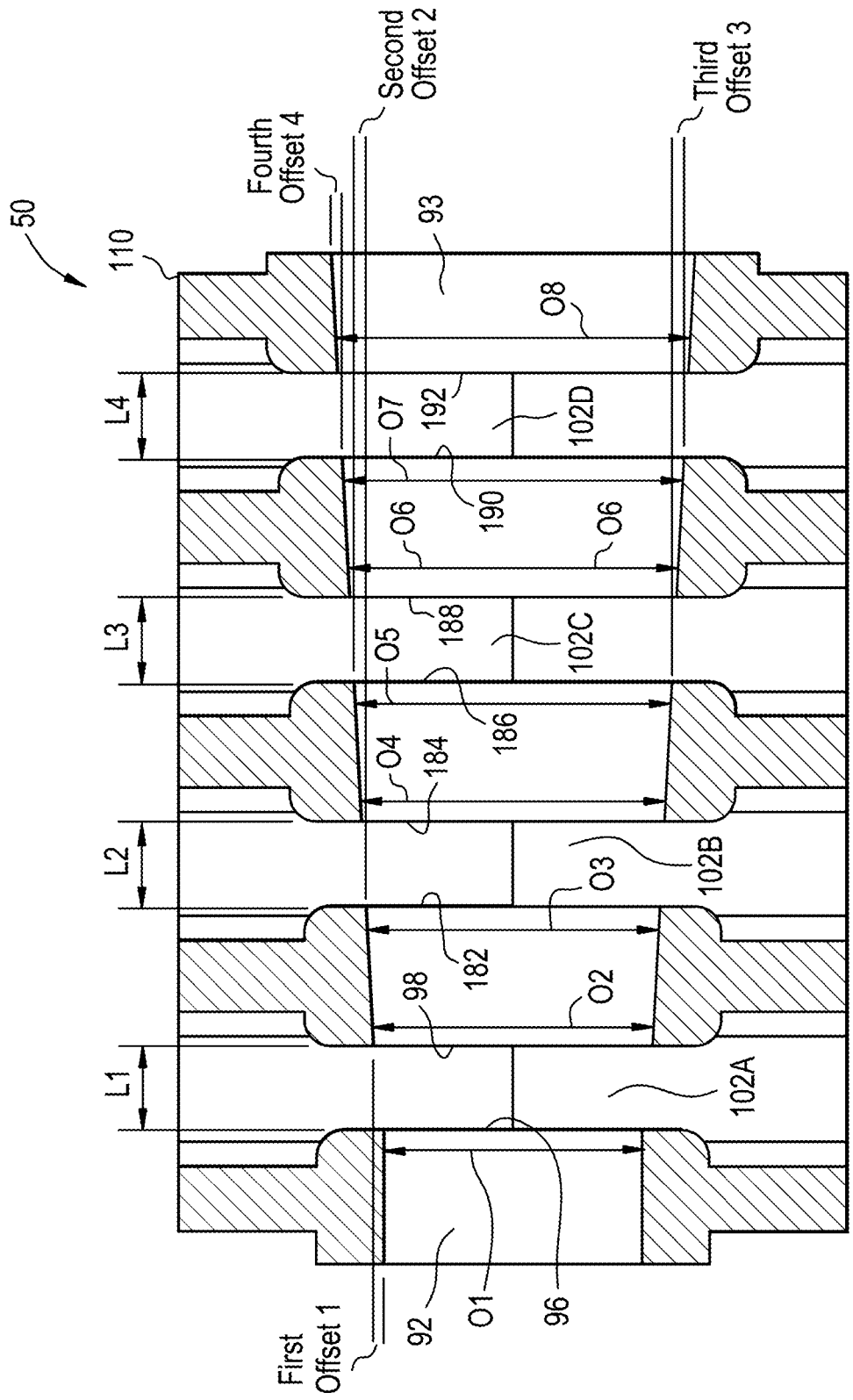
FIG. 6 is an enlarged view of a portion of the evacuator shown in FIG. 3, taken along section line B-B in FIG. 4.

As seen in FIG. 5, the first tapering portion 92 of the pneumatically actuated vacuum pump 50 may be fluidly coupled to the second tapering portion 93 by a Venturi gap 102A. The Venturi gap 102A may be a fluid junction that places the suction ports 72 in fluid communication with the motive section 90 and the discharge section 95 of the pneumatically actuated vacuum pump 50. As best seen in FIG. 6, the Venturi gap 102A may be the lineal distance L1 measured between the outlet end 96 of the first tapering portion 92 and the inlet end 98 of the second tapering portion 93. Based on identifying inlet end 98 of the discharge section 95 as shown in the figures, the second, third, and fourth Venturi gaps 102B, 102C, and 102D are all considered part of the discharge section 95, in particular as part of the second tapering portion 93 diverging away from the motive section 90. The outlet end 96 of the first tapering portion 92 of the pneumatically actuated vacuum pump 50 represents the inlet of the Venturi gap 102A. Similarly, the inlet end 98 of the second tapering portion 93 of the pneumatically actuated vacuum pump 50 represents the outlet of the Venturi gap 102A.

Turning back to FIG. 5, the inlet ends 94, 98 and the outlet ends 96, 100 of the passageway 80 of the pneumatically actuated vacuum pump 50 may include any type of profile, such as, but not limited to, a circular shape, an ellipse shape, or another polygonal form. Moreover, the gradually, continuously tapering inner diameter extending from inlet ends 94, 98 and the outlet ends 96, 100 of the passageway 80 may define a hyperboloid or a cone. Some exemplary configurations for the outlet end 96 of the first tapering portion 92 and the inlet end 98 of the second tapering portion 93 are presented in FIGS. 4-6 of co-pending U.S. patent application Ser. No. 14/294,727, filed on Jun. 3, 2014, which is incorporated by reference herein in its entirety.

Referring again to FIGS. 3-5, the body 78 of the pneumatically actuated vacuum pump 50 may define a housing 110. The housing 110 may surround or define a portion of the second tapering portion 93 of the pneumatically actuated vacuum pump 50, in particular it may define the Venturi gaps 102A, 102B, 102C, 102D. In the embodiment as illustrated, the housing 110 may include a generally rectangular profile, however the housing 110, in particular its exterior appearance, is not limited to a rectangular profile.

As illustrated in the FIGS. 4-6 and 8, a plurality of additional Venturi gaps 102B, 102C, 102D are located downstream of Venturi gap 102A, within the housing 110. In the embodiments shown in the figures, the pneumatically actuated vacuum pump 50 includes a total of four Venturi gaps. It is to be understood that these illustrations are merely exemplary embodiments of the pneumatically actuated vacuum pump 50 and that any number of Venturi gaps are possible. For a dual suction port embodiment such as in FIG. 8, at least two Venturi gaps 102A and 102C are required so that at least Venturi gap 102A can be in fluid communication with the first suction port 72'a and at least the other Venturi gap 102B can be in fluid communication with the second suction port 72'b. With respect to each suction port, a plurality of Venturi gaps may be positioned for alignment and fluid communication with each respective suction port, again providing for three, four or more total Venturi gaps. As shown in FIG. 8, Venturi gaps 102A and 102B are in fluid communication with the first suction port 72'a and Venturi gaps 102C and 102D are in fluid communication with the second suction port 72'b. In an embodiment with three or four suction ports (not shown), potentially two suction ports 72'a, 72'b on the top surface 130 of housing 110 as shown in FIG. 8 and one or two additional suction ports on the bottom surface 132 of the housing 110, a minimum of three or four Venturi gaps would present.

Each Venturi gap 102A, 102B, 102C, 102D may be a void located within the housing 110. Specifically, Venturi gaps 102A, 102B, 102C, 102D may each be similar to an interior cross-section of the housing 110. For example, as seen in FIG. 5, the Venturi gap 102A may include a generally rectangular profile that substantially corresponds with the interior cross-section of the housing 110. The flow of motive air through the first tapering portion 92 of the pneumatically actuated vacuum pump 50 may increase in speed, but creates low static pressure. This low static pressure draws air from the suction ports 72, 72'a into the Venturi gap 102A. The remaining gaps 102B, 102C, 102D located downstream of the Venturi gap 102A may also be used to further draw in air from one or more suction ports. In FIGS. 3-5, the Venturi gaps 102B, 102C, and 102D draw in air from two suction ports 72 at the same time. In FIG. 8, the Venturi gap 102B is used to further draw in air from the first suction port 72'a and Venturi gaps 102C and 102D draw in air from the second suction port 72'b. Likewise, in the embodiment of FIG. 9, evacuator 50", the Venturi gaps 102A and 102B drawn in air only from a first suction port 72'c as a first obstruction 202 prevents drawing in air from the second suction port 72'd and the Venturi gaps 102C and 102D drawn in air only from the second suction port 72'd as a second obstruction 204 prevents drawing air in from the first suction port 72'c.

Referring to FIGS. 4-5, the housing 110 may include a top surface 130 and a bottom surface 132. An upper check valve element 134 and an upper suction piece 136 may be positioned against the top surface 130, and a lower check valve element 140 and a lower suction piece 142 may be positioned against the bottom surface 132 when the pneumatically actuated vacuum pump 50 is assembled (shown in FIG. 3). Although both the upper check valve element 134 and the lower check valve element 140 are illustrated, it is to be understood in another embodiment the housing 110 may only include either the upper check valve element 134 or the lower check valve element 140. Specifically, the upper check valve element 134 may be positioned between the upper suction piece 136 and the top surface 130 of the housing 110, and the lower check valve element 140 may be positioned between the lower suction piece 142 and the bottom surface 132 of the housing 110. In one embodiment, the upper suction piece 136 and the lower suction piece 142 may each include barbs 150 for mating with a hose (not illustrated) that connects the suction ports 72 to the vacuum canister 30 (FIG. 1). For the embodiments in FIGS. 8 and 9, any pieces or parts that are the same or similar to those identified and described for FIGS. 3-5 have been given the same reference number.

The upper check valve element 134 and the lower check valve element 140 may be constructed of a relatively flexible material such as, for example, an elastomer. The flexible material enables the upper check valve element 134 and the lower check valve element 140 to bend or deform during operation of the pneumatically actuated vacuum pump 50.

Turning now to FIG. 4, the upper check valve element 134 may include a first section 160 and the lower check valve element 140 may include a first section 162. The first sections 160, 162 of the upper check valve element 134 and the lower check valve element 140 are each substantially parallel with the axis A-A of the pneumatically actuated vacuum pump 50. A plurality of outwardly projecting fingers or tabs 166A, 166B, 166C, 166D may extend outwardly and in a direction generally transverse with respect to the first section 160 of the upper check valve element 134. Similarly, a plurality of outwardly projecting fingers or tabs 170A, 170B, 170C, 170D extend in a direction generally transverse with respect to the first section 162 of the lower check valve element 140. Each of the plurality of tabs may extend from one side of the first section 160 or from both sides of the first section, typically aligned opposite one another.

Each of the tabs 166A, 166B, 166C, 166D of the upper check valve element 134 may correspond to and is fluidly connected to one of the Venturi gaps 102A, 102B, 102C, 102D. Similarly, each of the tabs 170A, 170B, 170C, 170D of the lower check valve element 140 may also correspond to and is fluidly connected to one of the Venturi gaps 102A, 102B, 102C, 102D, if present. As seen in FIG. 4, a recess 174 may be located along an upper surface 176 of the lower suction cap 142. The recess 174 may include a profile that generally corresponds with the lower check valve element 140. Thus, the lower check valve element 140 may be seated within the recess 174 of the lower suction cap 142. It is understood that a similar recess (which is not visible in the figures) may also be located along a lower surface 180 of the upper suction cap 146 as well, and includes a profile that generally corresponds with the upper check valve element 134.

Referring specifically to FIG. 4, when pressure located in the upper suction port 72 of the pneumatically actuated vacuum pump 50 is equal to or less than pressure in the Venturi gaps 102A, 102B, 102D the upper check valve element 134 may be seated flush within the upper suction cap 146, and the tabs 166A, 166B, 166C, 166D are not bent. Similarly, when pressure located in the lower suction port 72 of the pneumatically actuated vacuum pump 50 is equal to or less than pressure in the Venturi gaps 102A, 102B, 102C, 102D the lower check valve element 140 may be seated flush within the lower suction cap 142, and the tabs 170A, 170B, 170C, 170D are not bent. When the check valves 134, 140 are in the closed position, air from the upper and lower suction ports 72 of the pneumatically actuated vacuum pump 50 may not be suctioned into the Venturi gaps 10A, 102B, 102C, 102D.

When the pressure located in the upper suction port 72 of the pneumatically actuated vacuum pump 50 is greater than the pressure in the Venturi gaps 102A, 102B, 102C, 102D the upper check valve element 134 may open. Specifically, the upper check valve 134 is flexible enough such that the tabs 166A, 166B, 166C, 166D may bend inwardly along the first portion 160 and towards the Venturi gaps 102A, 102B, 102C, 102D thereby allowing air from the upper suction port 72 to be suctioned into the Venturi gaps 102A, 102B, 102C, 102D. Similarly, when the pressure located in the lower suction port 72 of the pneumatically actuated vacuum pump 50 is greater than the pressure in the Venturi gaps 102A, 102B, 102C, 102D the lower check valve element 140 may open. Specifically, the lower check valve 140 is flexible enough such that the tabs 170A, 170B, 170C, 170D may bend inwardly along the first portion 162 and towards the Venturi gaps 102A, 102B, 102C, 102D thereby allowing air from the lower suction port 72 to be suctioned into the Venturi gaps 102A, 102B, 102C, 102D.

Those skilled in the art will readily appreciate that each of the tabs 166A, 166B, 166C, 166D of the upper check valve element 134 may bend independently of one another. Similarly, each of the tabs 170A, 170B, 170C, 170D of the lower check valve element 140 may also bend independently of one another. Thus, during operation of the pneumatically actuated vacuum pump 50, only a portion of the Venturi gaps 102A, 102B, 102C, 102D may have their corresponding check valves open in order to allow air to be sucked out of the vacuum canister 30 (FIG. 1), while the remaining Venturi gaps 102A, 102B, 102C, 102D may have their corresponding check valves closed. Those skilled in the art will readily appreciate that the check valves 134, 140 illustrated in the figures are one embodiment of the present disclosure, and that other types of check valves may be used as well.

FIG. 6 is an enlarged, cross sectioned view of the Venturi gaps 102A, 102B, 102C, 102D located within the housing 110 of the pneumatically actuated vacuum pump 50. As described above, the Venturi gap 102A may be defined as the lineal distance L1 measured between the outlet end 96 of the first tapering portion 92 (seen in FIG. 5) and the inlet end 98 of the second tapering portion 93 (seen in FIG. 5). The remaining Venturi gaps 102B, 102C, 102D also include respective lineal distances L2, L3, L4. These lineal distances are each measured from a respective inlet wall and an outlet wall of each gap. Specifically, Venturi gap 102B is measured between an inlet surface 182 and an outlet surface 184, Venturi gap 102C is measured between an inlet surface 186 and an outlet surface 188, and Venturi gap 102D is measured between an inlet surface 190 and an outlet surface 192. The inlet surfaces 182, 186, and 190 and the outlet surfaces 184, 188, and 192 are all defined by the housing 110 of the pneumatically actuated vacuum pump 50.

Figure 7:
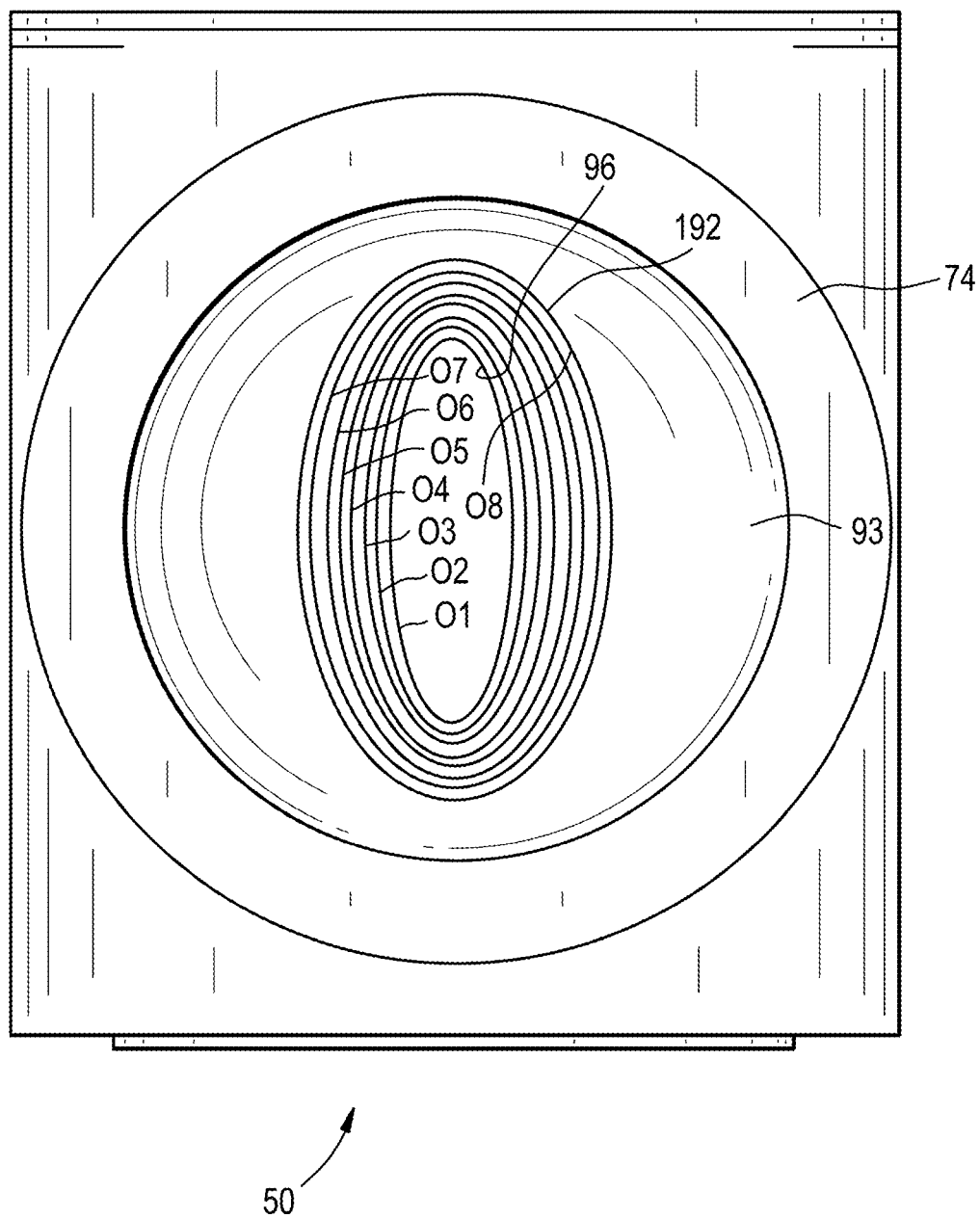
FIG. 7 is an end view of the evacuator when viewed from the discharge port.

FIG. 7 is an illustration of the pneumatically actuated vacuum pump 50 when viewed from the discharge port 74. Referring to FIGS. 6, and 7, the diverging profile of the second tapering portion 93 of the pneumatically actuated vacuum pump 50 creates an offset or difference in the inlet and outlet openings of each Venturi gap 102A, 102B, 102C, and 102D. As seen in FIGS. 5, 7, 8 and 9, the inlet and outlet openings of the Venturi gaps 102A, 102B, 102C, 102D each include a substantially elliptical profile. However, as explained above, in another embodiment the inlet and outlet openings may include another type of profile instead. As labeled in FIG. 7, but as applicable to FIGS. 5, 8, and 9 also, the outlet end 96 of the first tapering portion 92 (which represents the inlet of the Venturi gap 102A) includes an opening O1, and the inlet end 98 of the second tapering portion 93 (which represents the outlet of the Venturi gap 102A) includes an opening O2. The profile of the opening O2 of the outlet is sized to be greater than the opening O1 of the inlet of the Venturi gap 102A. In other words, there is an offset between the inlet and the outlet openings of the Venturi gap 102A. A first offset 1 represents the difference between the inlet and outlet openings of the Venturi gap 102A. In one non-limiting embodiment, the first offset 1 may be about 0.25 millimeters.

Continuing to refer to both FIGS. 6 and 7, an opening O3 is associated with the inlet surface 182 of the Venturi gap 102B, and an opening O4 is associated with the outlet surface 184 of the second gap 102B. Similar to the Venturi gap 102A, the opening O4 of the outlet surface 184 is greater than the opening O3 of the inlet surface 182. A second offset 2 represents the difference between the inlet surface 182 and the outlet surface 184 of the second gap 102B. Similarly, an opening O5 is associated with the inlet surface 186 of the Venturi gap 102C, and an opening O6 is associated with the outlet 188 of the Venturi gap 102C. A third offset 3 represents the difference between the inlet surface 186 and the outlet surface 188 of the Venturi gap 102C. Finally, an opening O7 is associated with the inlet surface 190 of the Venturi gap 102D, and an opening O8 is associated with the outlet 192 of the Venturi gap 102D. A fourth offset 4 represents the difference between the inlet surface 190 and the outlet surface 192 of the Venturi gap 102D.

Referring generally to FIGS. 5 and 6, during operation an area of minimum pressure may be created within the body 78 of the pneumatically actuated vacuum pump 50. In particular, the area of minimum pressure may be located adjacent or within one or more of the Venturi gaps 102A, 102B, 102C, 102D of the pneumatically actuated vacuum pump 50. The area of minimum pressure also represents an area of maximum velocity within the pneumatically actuated vacuum pump 50. Those skilled in the art will readily appreciate that if the pneumatically actuated vacuum pump 50 is operating as an ejector, then as the motive pressure of the pneumatically actuated vacuum pump 50 increases the location of the minimum pressure within the pneumatically actuated vacuum pump 50 may shift or move downstream within the second tapering portion 73. As the location of minimum pressure within the pneumatically actuated vacuum pump 50 shifts downstream of the Venturi gap 102A, the Venturi gaps 102B, 102C, 102D may be used to further suction air out of the vacuum canister 30. Those skilled in the art will also readily understand that if the pneumatically actuated vacuum pump 50 is operating as an aspirator, then as the pressure at the discharge port 74 decreases the location of the minimum pressure may also shift or move downstream as well.

Continuing to refer to FIG. 6, the lineal distances L1, L2, L3, L4 of each of the Venturi gaps 102A, 102B, 102C, 102D located within the housing 110 of the pneumatically actuated vacuum pump 50 may be adjusted or tuned in order to accommodate the location of the minimum pressure within the pneumatically actuated vacuum pump 50. Specifically, one of the lineal distances L1, L2, L3, L4 of one of the Venturi gaps 102A, 102B, 102C, 102D located within the housing 110 of the pneumatically actuated vacuum pump 50 may be designed to be narrower or decreased in length if a higher suction vacuum (i.e., lower suction pressures) at a specific set of operating conditions is desired.

In addition to decreasing the length of one of the Venturi gaps 102A, 102B, 102C, 102D, the offset distances (i.e., the first offset 1, the second offset 2, the third offset 3, or the fourth offset 4) may be decreased as well in order to produce a higher suction vacuum (i.e., lower suction pressures) at a specific set of operating conditions. In other words, if a specific one of the Venturi gaps decreases in length, then the difference between the respective inlet and outlet opening of the specific gap should also decrease as well. Similarly, one of the lineal distances L1, L2, L3, L4 of one of the Venturi gaps 102A, 102B, 102C, 102D located within the housing 110 of the pneumatically actuated vacuum pump 50 may be designed to be wider or increased in length if a higher suction flow rate at a specific set of operating conditions is desired. In addition to increasing the length of one of the Venturi gaps 102A, 102B, 102C, 102D, the offset distance associated with one of the Venturi gaps (i.e., the first offset 1, the second offset 2, the third offset 3, or the fourth offset 4) should be increased as well in order to produce a higher suction flow rate at a specific set of operating conditions. In other words, if a specific one of the Venturi gaps increases in length, then the difference between the respective inlet and outlet openings of the specific gap should also increase as well.

A specific set of operating conditions may be defined by the pressures at both the motive port 70 as well as the discharge port 74 of the pneumatically actuated vacuum pump 50. For example, during one set of operating conditions the motive port 70 is at atmospheric pressure and if the discharge port 74 is at about eighty percent of atmospheric pressure. During this set of operating conditions, the pneumatically actuated vacuum pump 50 is operating as an aspirator. In this example, the location of the minimum pressure within the pneumatically actuated vacuum pump 50 may be assumed or determined to be at the Venturi gap 102A. If the engine 12 (seen in FIG. 1) operates to produce these exemplary conditions for a significant amount of time, then a designer or engineer may determine it generally advantageous to adjust the lineal distance L1 of the Venturi gap 102A accordingly (i.e., the lineal distance L1 of the Venturi gap 102A should be widened or narrowed depending on requirements). In addition to adjusting the lineal distance L1, it is to be understood that the second offset 2 may also be adjusted accordingly as well. For example, if the lineal distance L1 of the Venturi gap 102A is increased, then the second offset 2 may increase as well. Similarly, if the lineal distance L1 of the Venturi gap 102A is decreased, then the second offset 2 may decrease as well.

In another illustrative example, if the pressure of the motive port 70 is higher than atmospheric pressure (e.g., at about 168 kilopascals) and if the discharge port 74 is also higher than atmospheric pressure but less than the motive port 70 (e.g., at about 135 kilopascals), then the pneumatically actuated vacuum pump 50 is operating as an ejector. In this example, the location of the minimum pressure within the pneumatically actuated vacuum pump 50 is assumed or determined to be at the Venturi gap 102C. If the engine 12 (seen in FIG. 1) operates to produce these exemplary conditions for a significant amount of time, then a designer or engineer may determine it generally advantageous to adjust the lineal distance L3 of the Venturi gap 102C accordingly (i.e., either the Venturi gap 102C should be widened or narrowed). In addition to adjusting the lineal distance L3 of the Venturi gap 102C, it is to be understood that the third offset 3 may also be adjusted accordingly as well. For example, if the lineal distance L3 of the Venturi gap 102C is increased, then the third offset 3 may increase as well.

Similarly, if the lineal distance L3 of the Venturi gap 102C is decreased, then the third offset 3 may decrease as well.

Referring now to FIGS. 8 and 9, two alternate embodiments are provided in which the first and second Venturi gaps 102A and 102B are in fluid communication with a first suction port 72'a, 72'c, respectively, and the second and third Venturi gaps 102C and 102D are in fluid communication with the second suction port 72'b, 72'd, respectively. The fluid communication is controlled by the presence of a check valve element 134 and/or 140, if present. The first suction ports 72'a, 72'c are connected to a first device requiring vacuum 32a and the second suction ports 72'b, 72'd are connected to a second device requiring vacuum 32b.

In this first dedicated suction port embodiment, the first device requiring vacuum 32a is a brake boost canister and the second device requiring vacuum 32b is a fuel vapor purge canister. For this first embodiment, as shown in both FIGS. 8 and 9, the first and second Venturi gaps 102A and 102B are positioned closer to the motive exit. This position of the Venturi gaps is advantageous for higher vacuum suction, which is desirable for a brake boost system, compared to those Venturi gaps closer to the outlet end 100 of the discharge section 95. Moreover, as explained above, the first and second Venturi gaps 102A and 102B can be tuned for higher vacuum suction by decreasing the lineal distance L1 and/or decreasing the first offset 1 and/or the second offset 2. In this first embodiment, the third and fourth Venturi gaps 102C and 102D are positioned closer to the outlet end 100 of the discharge section 95. This position of the Venturi gaps is advantageous for higher suction flow rate, typically for a longer time, which is desirable for a fuel vapor purge canister, compared to the first and second Venturi gaps 102A and 102B. Moreover, as explained above, the third and fourth Venturi gaps 102C and 102D can be tuned for higher suction flow rates by increasing the lineal distance L3 and/or L4 and/or increasing the third offset 3 and/or the fourth offset 4.

In another dedicated suction port embodiment, the first device requiring vacuum 32a is a turbocharger bypass pneumatic actuator and the second device requiring vacuum 32b is a fuel vapor purge canister. Here, as shown in both FIGS. 8 and 9, the first and second Venturi gaps 102A and 102B are connected to the first device requiring vacuum and are positioned closer to the motive exit. This position of the Venturi gaps is advantageous for higher vacuum suction, which is desirable for a turbocharger bypass pneumatic actuator. Moreover, as explained above, the first and second Venturi gaps 102A and 102B can be tuned for higher vacuum suction by decreasing the lineal distance L1 and/or decreasing the first offset 1 and/or the second offset 2. Moreover, if additional vacuum is needed to operate the turbocharger bypass pneumatic actuator, the third Venturi gap 102C may also be in fluid communication with only the first suction port 72'a, 72'c. Accordingly, the third and fourth Venturi gaps 102C and 102D or the fourth Venturi gap 102D alone, or the fourth Venturi gap 102D and one or more additional Venturi gaps (not shown) may be in fluid communication with the second device requiring vacuum 32b. This position of the Venturi gaps, which is closer to the outlet end 100 of the discharge section 95, is advantageous for higher suction flow rate, typically for a longer time, which is desirable for a fuel vapor purge canister. Moreover, as explained above, these Venturi gaps can be tuned for higher suction flow rates by increasing their respective lineal distances and/or increasing the their respective offsets 3.

It is to be understood that various combination of devices are possible for the first and second devices requiring vacuum 32a, 32b and further that a third and/or fourth device requiring vacuum may be connected to the same evacuator as well by additional suction ports, as explained above. Depending upon the number of devices requiring vacuum and the type of devices, the Venturi gaps 102A, 102B, 102C, 102D connected to the respective devices should be chosen depending upon the device's need for high or low suction vacuum and high or low suction flow rate and the same may be adjusted or tuned to those needs. For example, in one embodiment, one of the Venturi gaps 102A, 102B, 102C, 102D may be increased in length to provide a higher suction flow rate at a first set of operating conditions, and the remaining Venturi gaps 102A, 102B, 102C, 102D may be decreased in length to provide a higher suction vacuum at another set of operating conditions.

Again referring to FIG. 9, the fluid communication between the Venturi gaps 102A-102D is controlled by the presence of a check valve elements 134, 140. Here, since only the first and second Venturi gaps 102A and 102B fluidly communicate with the first suction port 72'c, an obstruction 204 is present that obstructs (prevents) fluid communication between any downstream Venturi gaps and the first suction port 72'c. Similarly, since only the third and fourth Venturi gaps 102C and 102D fluidly communication with the second suction port 72'd, an obstruction 202 is present that obstructs (prevents) fluid communication between any upstream Venturi gaps and the second suction port 72'd.

In an alternate embodiment, as provided in FIG. 10, rather than having obstructions 202 or 204 coordinated with selected Venturi gaps, a check valve element 208 is provided that includes selected tabs thereof that are rigid, those included on the right section 212, and other selected tabs that are elastically flexible, those included on the left section 210, to move between a closed position and an open position. While the check valve element 208 is illustrated as having one-half rigid tabs and one-half flexible tabs, the rigid and flexible tabs may be dispersed as needed to coordinate with selected Venturi gaps and their respective suction ports.

Fletch insert 220, as shown in FIG. 8, may be included in any of the embodiments disclosed herein. The fletch insert 220 is described as set forth in co-pending, co-owned U.S. provisional Patent Application No. 62/042,569 filed on Aug. 27, 2014, which is incorporated in its entirety herein by reference.

Figure 11:
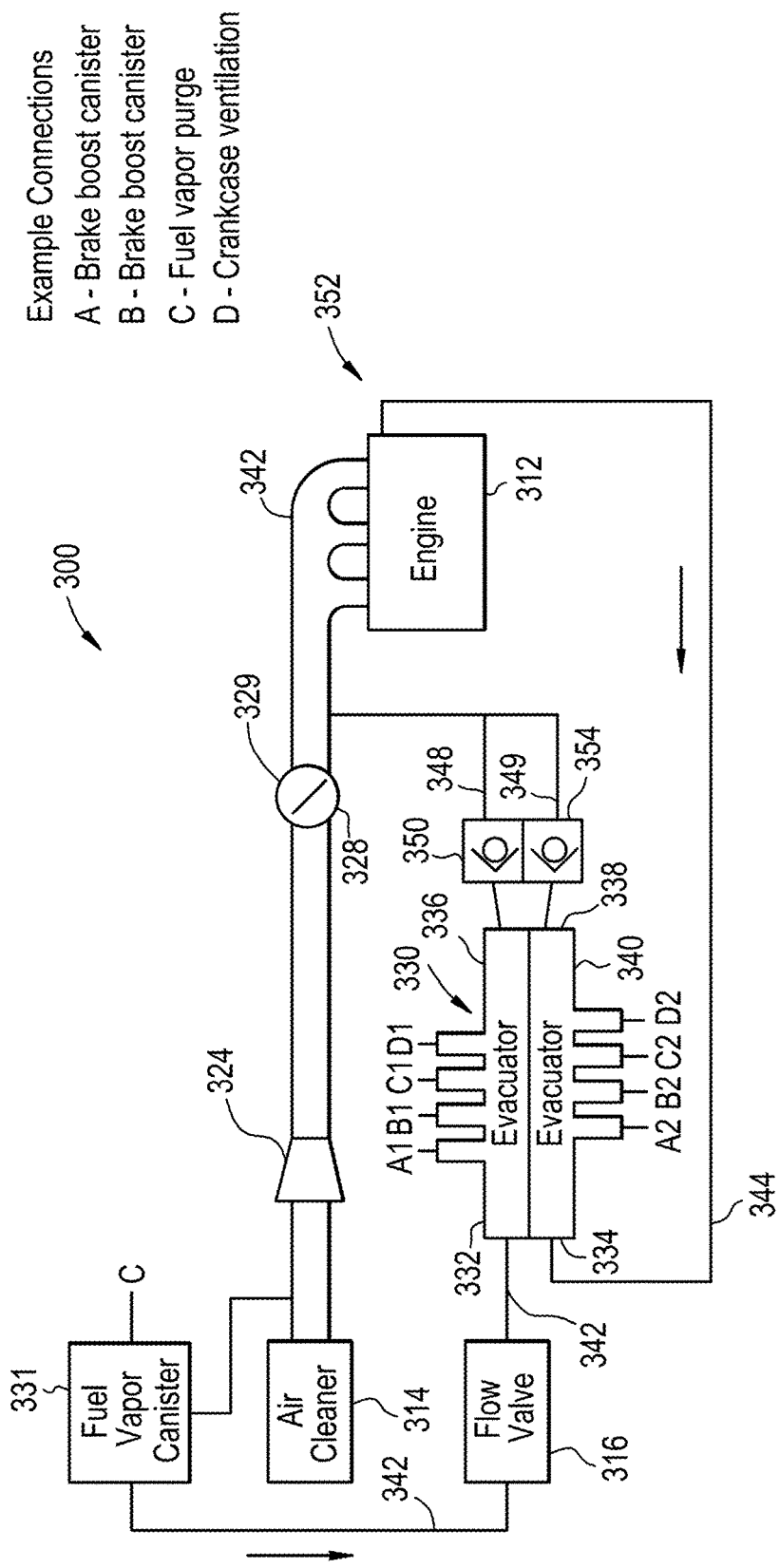
FIG. 11 is a schematic diagram including flow paths and flow directions of another embodiment of an internal combustion engine turbo system including a multi-port evacuator.

Referring now to FIG. 11, an exemplary turbocharged engine air system 300 for providing vacuum is disclosed. The engine air system 300 may include an internal combustion engine 312, an air cleaner 314, a flow valve 316, a multi-port evacuator 330, a compressor 324, a turbine (not shown), a throttle 328, and a fuel vapor canister 331. As explained in greater detail below, the multi-port evacuator 330 may provide vacuum to a plurality of vacuum consuming devices such as a brake boost canister (not illustrated in FIG. 11), the fuel vapor canister 331, and a crankcase ventilation system 352.

Similar to the embodiment as shown in FIG. 1, the internal combustion engine 312 may be, for example, an SI engine, a CI engine, or part of an electric motor/battery system in a hybrid vehicle. The compressor 324 and turbine may be part of a turbocharger for improving the power output and overall efficiency of the internal combustion engine 312. The turbine may include a turbine wheel (not illustrated in FIG. 11) that harnesses and converts exhaust energy into mechanical work through a common shaft to turn a compressor wheel (not illustrated in FIG. 11) of the compressor 324. The compressor wheel ingests, compresses, and feeds air at elevated operating pressures into an intake manifold 342 of the internal combustion engine 312. The throttle 328 is located downstream of the air cleaner 314 and the compressor 324, and upstream of the intake manifold 342 of the internal combustion engine 312.

The evacuator 330 includes a first motive inlet 332, a second motive inlet 334, a first discharge outlet 336, a second discharge outlet 338, and a pneumatically actuated vacuum pump 340. In the embodiment as shown in FIG. 11, the first motive inlet 332 of the evacuator 330 is fluidly connected with the fuel vapor canister 331, as represented by conduit line 342. The flow valve 316 is located within the conduit line 342. The flow valve 316 may be a shut-off valve, and is used to control whether vacuum is provided to the fuel vapor canister 331. Those skilled in the art will readily appreciate that the fuel vapor canister 331 may only need purging for a specified period of time after start-up of a vehicle. One non-limiting example of the flow valve is described in co-pending, co-owned U.S. provisional Patent Application No. 61/914,658 filed on Dec. 11, 2013, which is incorporated in its entirety herein by reference.

Continuing to refer to FIG. 11, the second motive inlet 334 of the evacuator 330 is fluidly connected with the crankcase ventilation system 352, as represented by conduit line 344. Both the discharge outlets 336, 338 of the evacuator 330 are fluidly connected to the engine air system 300 at a location upstream of the intake manifold 342 and downstream of an outlet 329 of the throttle 328. Specifically, a first check valve 350 may be included in a conduit line 348 between the first discharge outlet 336 of the evacuator 330 and junction between the throttle 328 and the intake manifold 342. Similarly, a second check valve 354 may be included in a conduit line 349 between the second discharge outlet 338 of the evacuator 330 and junction between the throttle 328 and the intake manifold 342.

The pneumatically actuated vacuum pump 340 may supply vacuum to a plurality of vacuum consuming devices. In particular, the pneumatically actuated vacuum pump 340 supplies vacuum to the brake boost canister (not illustrated), the fuel vapor canister 331, and the crankcase ventilation system 352. As explained in greater detail below, the pneumatically actuated vacuum pump 340 is fluidly connected to the brake boost canister, the fuel vapor canister 331, and the crankcase ventilation system 352 via a plurality of upper suction ports A1, B1, C1, D1. The pneumatically actuated vacuum pump 340 is also fluidly connected to the brake boost canister, the fuel vapor canister 331, and the crankcase ventilation system 352 via a plurality of lower suction ports A2, B2, C2, D2. Those skilled in the art will readily appreciate that while the brake boost canister, fuel vapor canister 331, and the crankcase ventilation system 352 are illustrated or described in FIG. 11, the pneumatically actuated vacuum pump 340 may include additional suction ports to provide vacuum to other vacuum consuming devices within a vehicle as well. Alternatively, the pneumatically actuated vacuum pump 340 may provide vacuum to different vacuum consuming devices within a vehicle instead.

The evacuator 330 may operate to produce vacuum to the various vacuum requiring systems if the pressure at the motive inlets 332, 334 of the evacuator 330 are at atmospheric pressure and the pressure at the discharge outlets 336, 338 are less than the pressure at the motive inlets 332, 334. In other words, the evacuator 330 operates as an aspirator during operation of the engine 312.

As illustrated in FIG. 11, the evacuator 330 includes multiple suction ports connected to the multiple devices requiring vacuum. Specifically, the first upper suction port A1, located closest to the first motive inlet 332 of the evacuator 330, is fluidly connected to the brake booster system. The second upper suction port B1, which is located immediately adjacent to the first suction port A1 of the evacuator 330, is fluidly connected to the brake booster system as well. As explained above, the proximity of the first and second upper suction ports A1, B1 to the first motive inlet 332 of the evacuator 330 facilitates a higher vacuum suction, which is required by brake boost systems. Similarly, the first lower suction port A2, located closest to the second motive inlet 334 of the evacuator 330, is also fluidly connected to the brake booster system. The second lower suction port B2, which is located immediately adjacent to the suction port A2 of the evacuator 330, is fluidly connected to the brake booster system as well. The proximity of the lower first and second suction ports A2, B2 to the second motive inlet 334 of the evacuator 330 facilitates a higher vacuum suction as well.

Continuing to refer to FIG. 11, the third upper suction port C1, which is immediately adjacent to second upper suction port B1 of the evacuator 330, is fluidly connected to the fuel vapor canister 331. The fourth upper suction port D1, which is immediately adjacent the first discharge outlet 336 of the evacuator 330, is fluidly connected to the crankcase ventilation system 352. As explained above, the proximity of the upper third and fourth suction ports C1, D1 to the discharge outlet 336 of the evacuator 330 facilitates a higher suction flow rate. Similarly, the third lower suction port C2, which is immediately adjacent to second lower suction port B2 of the evacuator 330, is also fluidly connected to the fuel vapor canister 331. The fourth lower suction port D2, which is immediately adjacent the second discharge outlet 338 of the evacuator 330, is fluidly connected to the crankcase ventilation system 352. The proximity of the third and fourth lower suction ports C2, D2 to the second discharge outlet 338 of the evacuator 330 facilitates a higher suction flow rate as well.

Figure 12:
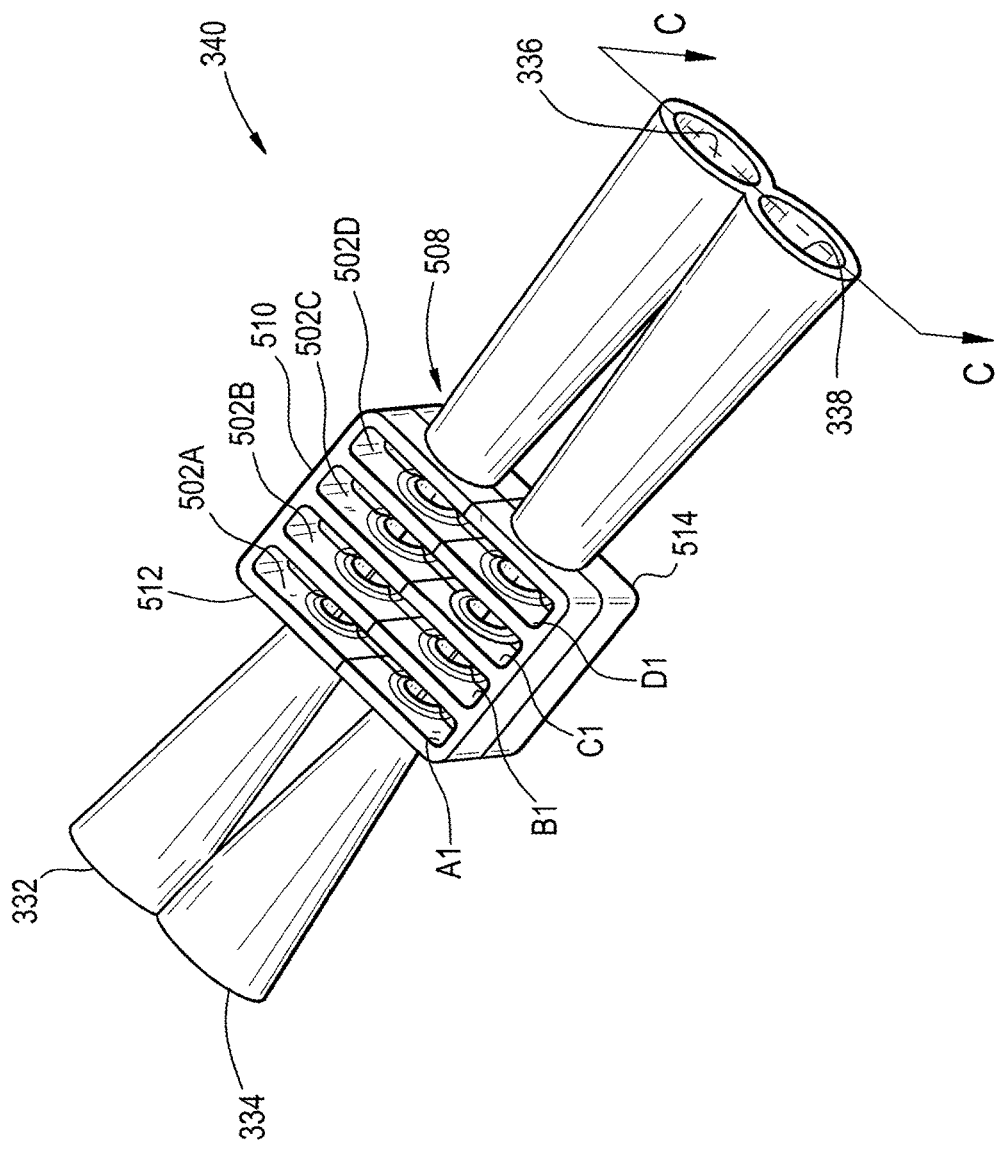
FIG. 12 is an elevated view of the evacuator shown in FIG. 11.
Figure 13:
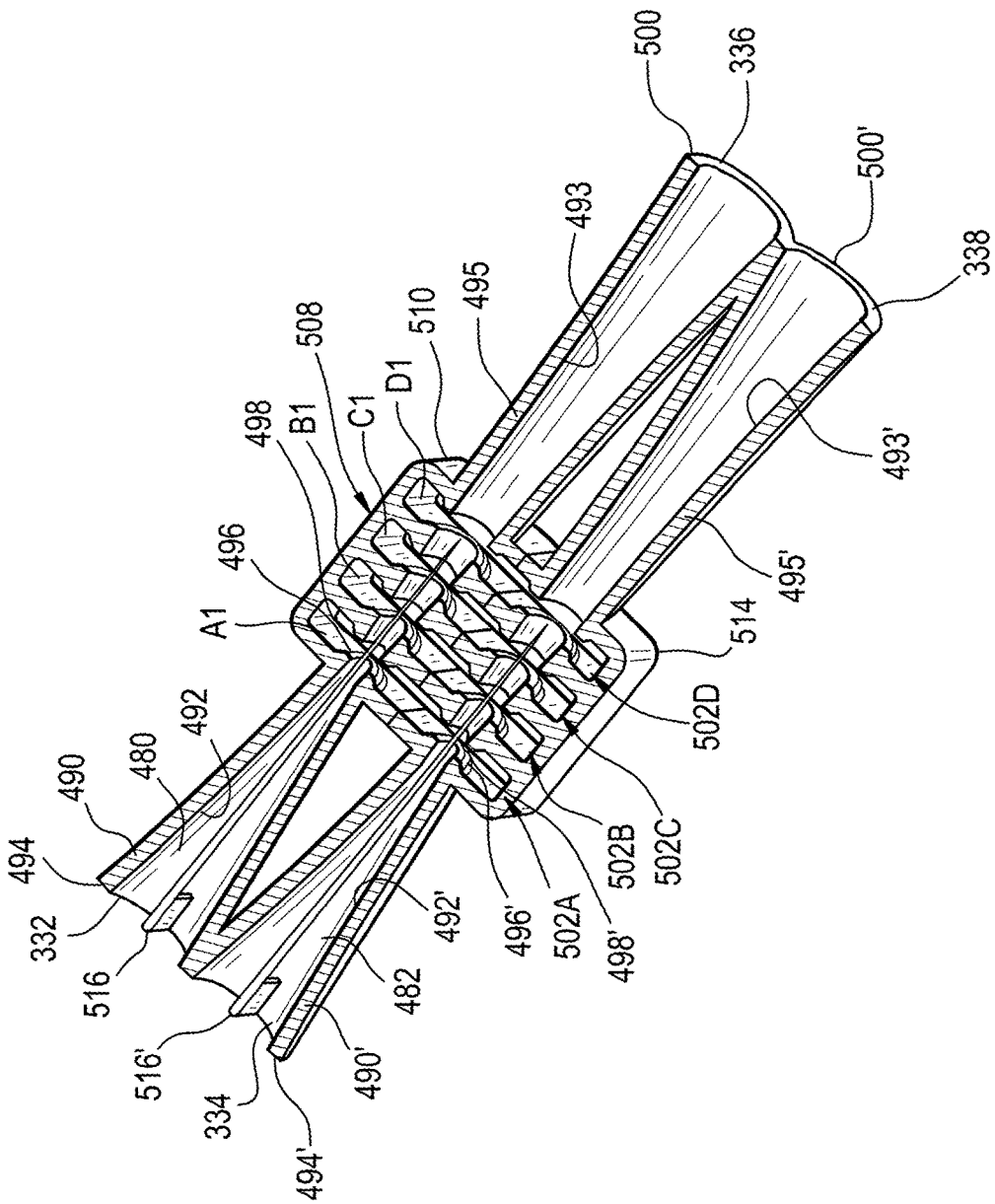
FIG. 13 is a cross-sectioned view of the evacuator taken along section line C-C in FIG. 12.

FIG. 12 is an elevated view of the pneumatically actuated vacuum pump 340, and FIG. 13 is a cross-sectioned view of the pneumatically actuated vacuum pump 340 taken along section line C-C in FIG. 12. Referring to both FIGS. 12 and 13, the pneumatically actuated vacuum pump 340 may define two passageways 480, 482. Specifically, a first or upper passageway 480 may define the first motive inlet 332 and the first discharge outlet 336. The upper passageway 480 may include a first tapering portion 492 (also referred to as a motive cone) in a motive section 490 of the upper passageway 480. The upper passageway 480 may also include a second tapering portion 493 (also referred to as a discharge cone) in a discharge section 495 of the upper passageway 480. The first tapering portion 492 of the passageway 480 may include an inlet end 494 and an outlet end 496. Similarly, the second tapering portion 493 of the upper passageway 480 may also include an inlet end 498 and an outlet end 500.

A second or lower passageway 482 may define the second motive inlet 334 and the second discharge outlet 338. The lower passageway 482 may include a first tapering portion 492' in a motive section 490' of the lower passageway 482. The lower passageway 482 may also include a second tapering portion 493' in a discharge section 495' of the lower passageway 482. The first tapering portion 492' of the lower passageway 482 may include an inlet end 494' and an outlet end 496'. Similarly, the second tapering portion 493' of the lower passageway 482 may also include an inlet end 498' and an outlet end 500'. It is to be understood that while the figures illustrate the evacuator 330 including two motive inlets and two motive outlets, the evacuator 330 may include more than two motive inlets as well. Furthermore, the evacuator 330 may also include more than two discharge outlets as well. However, it is to be understood that the number of motive inlets of the evacuator 330 should be equal to the number of discharge outlets.

As seen in FIG. 13, the first tapering portions 492, 492' of the pneumatically actuated vacuum pump 340 may be fluidly coupled to the second tapering portions 493, 493' by a Venturi gap 502A. In particular, the Venturi gap 502A may be located between the outlet ends outlet end 496, 496' of the first tapering portions 492, 492' and the inlet ends 498, 498' of the second tapering portions 493, 493'. A body 508 of the pneumatically actuated vacuum pump 340 may define a housing 510. The housing 510 may surround or define a portion of the second tapering portions 593, 593' of the pneumatically actuated vacuum pump 340. In particular, the housing 508 may define the Venturi gap 502A, as well as a plurality of additional gaps 502B, 502C, 502D. In the embodiment as illustrated, the housing 510 may include a generally rectangular profile, however it is understood that the embodiment is merely exemplary in nature and the housing 510 is not limited to a rectangular profile.

The Venturi gaps 502B, 502C, 502D are located downstream of Venturi gap 502A, within the housing 508. In the embodiments shown in the figures, the pneumatically actuated vacuum pump 340 includes a total of four Venturi gaps. It is to be understood that these illustrations are merely exemplary embodiments of the pneumatically actuated vacuum pump 340 and that any number of Venturi gaps are possible. In particular, in another embodiment the evacuator 330 may only include a single Venturi gap used to fluidly couple the first tapering portions 492, 492' of the pneumatically actuated vacuum pump 340 to the second tapering portions 493, 493'. However, those skilled in the art will readily appreciate that in the embodiment as shown in FIG. 11, at least four Venturi gaps are required so that at least Venturi gaps 502A, 502B may be in fluid communication with the brake boost canister, the Venturi gap 502C may be in fluid communication with fuel vapor canister 331 (FIG. 11), and the Venturi gap 502D may be in fluid communication with the crankcase ventilation system 352 (FIG. 11).

As seen in FIG. 13, a fletch insert 516 may be disposed within the first tapering portion 492 of the evacuator 330, and may extend into one or more of the Venturi gaps 502A, 502B, 502C, 502D. Similarly, a fletch insert 516' may be disposed within the first tapering portion 492' of the evacuator 330 as well, and may also extend into one or more of the Venturi gaps 502A, 502B, 502C, 502D.

Each Venturi gap 502A, 502B, 502C, 502D may be a void located within the housing 508. Specifically, Venturi gaps 502A, 502B, 502C, 502D may each be similar to an interior cross-section of the housing 508. For example, the Venturi gap 102A may include a generally rectangular profile that substantially corresponds with the interior cross-section of the housing 508. In particular, the first upper suction port A1 may correspond with Venturi gap 502A of the evacuator 330, the second upper suction port B1 may correspond with Venturi gap 502B of the evacuator 330, the third upper suction port C1 may correspond with Venturi gap 502C of the evacuator 330, and finally the fourth upper suction port D1 may correspond with Venturi gap 502D of the evacuator 330. Similarly, the first lower suction port A2 may correspond with Venturi gap 502A of the evacuator 330, the second lower suction port B2 may correspond with Venturi gap 502B of the evacuator 330, the third lower suction port C2 may correspond with Venturi gap 502C of the evacuator 330, and finally the fourth lower suction port D2 may correspond with Venturi gap 502D of the evacuator 330. Although the lower suction ports A2, B2, C2, D2 are not visible in FIGS. 12-13, it is to be understood that the housing 510 includes an upper surface 512 (seen in FIG. 12) and a lower surface 514. The lower surface 514 (which is not fully visible in the figures) is substantially identical in shape and geometry as the upper surface 512 of the housing 510.

Referring to FIGS. 11-13, the Venturi gaps 502A and 502B draw in air from the first and second upper suction ports A1, B1 as well as the first and second lower suction ports A2, B2 all at the same time. The Venturi gap 502C is used to draw in air from the third upper suction port C1 as well as the third lower suction port C2. Finally, the Venturi gap 502D is used to draw in air from the fourth upper suction port D1 as well as the fourth lower suction port D2. Similar to the embodiments as discussed above and illustrated in FIGS. 2-10, the Venturi gaps 502A, 502B, 502C, 502D may be tuned or adjusted based on the number of devices requiring vacuum, as well as the specific type of devices requiring vacuum. For example, in one embodiment, the Venturi gaps 502A, 502B may be increased in length to provide a higher suction vacuum at a first set of operating conditions, and the remaining Venturi gaps 502C, 502D may be decreased in length to provide a higher suction flow rate at another set of operating conditions.

Continuing to refer to FIGS. 11-13, the fluid communication between the Venturi gaps 502A-502D and the various devices requiring vacuum may be controlled by the presence of check valve elements (not illustrated in FIGS. 12-13). Specifically, a check valve element, similar to the check valve element 134 shown in FIG. 4, may be disposed along the upper surface 512 of the housing 510 of the evacuator 330. However, it is to be understood that the check valve element disposed along the upper surface 512 of the housing 510 should be shaped to correspond with the specific geometry of the Venturi gaps 502A-502D. Similarly, a check valve element, similar to the check valve element 140 shown in FIG. 4, may be disposed along the lower surface 514 of the housing 510 of the evacuator 330. The check valve element disposed along the lower surface 514 of the housing 510 should be shaped correspond with the specific geometry of the Venturi gaps 502A-502D.

Figure 14:
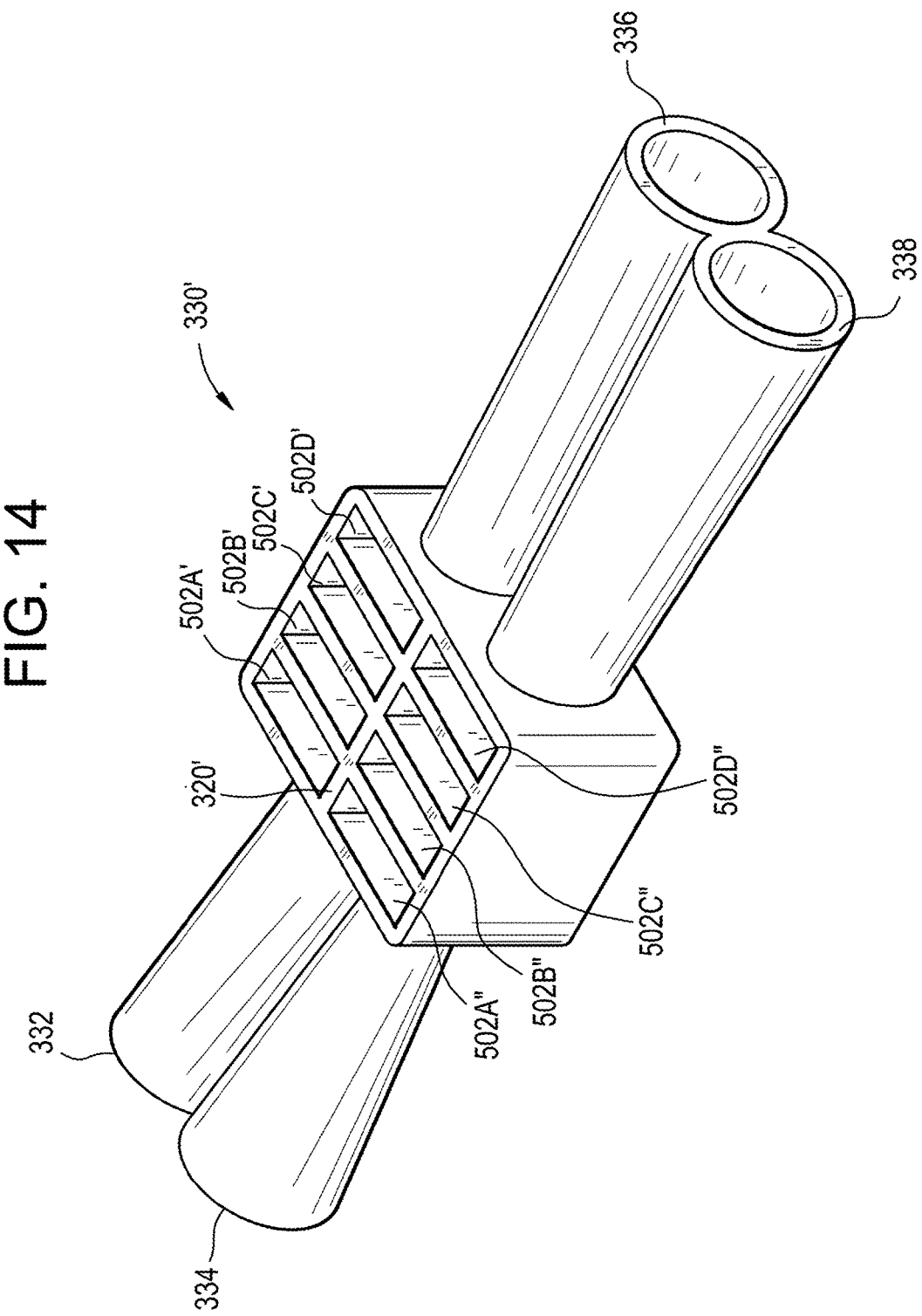
FIG. 14 is an alternative embodiment of the evacuator shown in FIG. 12.

In the embodiment as illustrated in FIGS. 12-13, the Venturi gaps 502A, 502B, 502C, 502D are each in fluid communication with the first motive inlet 332, the second motive inlet 334, the first discharge outlet 336, and the second discharge outlet 338. In other words, the evacuator 330 operates as a single, unitary evacuator device. Turning now to FIG. 14, an alternative embodiment of an evacuator 330' for providing vacuum is disclosed. The evacuator 330' includes all the components of the evacuator 330 shown in FIGS. 12-13 and as such like reference number refer to the same components and a description thereof is not duplicated here. However, unlike the embodiment as shown in FIGS. 11-12, the evacuator 330' includes a partitioning wall 320' located within the housing 510, and extending in a direction that is substantially parallel with the motive inlets 32, 334 and the discharge outlets 336, 338. In other words, the partitioning wall 320' extends in a direction substantially parallel with the flow of fluid within the evacuator 330.

The partitioning wall 320' may be used to section off or isolate portions of the Venturi gaps such that fluid may only flow from one of the motive inlets 332, 334 to a respective one of the discharge outlets 336, 338. Specifically, as seen in FIG. 14, the partitioning wall 320' creates a plurality of first Venturi gaps 502A', 502B', 502C', 502D' as well as a plurality of second Venturi gaps 502A", 502B", 502C", 502D". Each of the first Venturi gaps 502A', 502B', 502C', 502D' are fluidly connected to the first motive inlet 332 and the first discharge outlet 336. Thus, fluid passing through the first motive inlet 332 may only exit though the first discharge outlet 336 of the evacuator 330'. Similarly, each of the second Venturi gaps 502A", 502B", 502C", 502D" are fluidly connected to the second motive inlet 334 and the second discharge outlet 338.

It is appreciated that the partitioning wall 320' enables the evacuator 330' to operate as two distinct evacuators within the same component. In other words, the first motive inlet 332, the first discharge outlet 336, and the first Venturi gaps 502A', 502B', 502C', 502D' cooperate together to operate as a first evacuator, and the second motive inlet 334, the second discharge outlet 338, and the second Venturi gaps 502A", 502B", 502C" also cooperate together to operate as a second evacuator. Those skilled in the art will readily appreciate that the disclosed evacuator 330' may be molded as a single, unitary part, thereby reducing the cost and complexity associated with molding two separate components.

Although a turbocharged engine air system 300 is disclosed in FIG. 11, it is to be understood that any of the disclosed evacuators 330, 330' may also be used in a non-boosted engine as well. FIG. 15 is an illustration of a normally aspirated engine air system 600. The engine air system 300 may include an internal combustion engine 612, an air cleaner 614, a flow valve 616, the evacuator 330, a throttle 628, and a fuel vapor canister 631. Similar to the embodiment as shown in FIG. 11, the evacuator 330 may provide vacuum to a plurality of vacuum consuming devices such as a brake boost canister (not illustrated in FIG. 15), the fuel vapor canister 631, and a crankcase ventilation system 652.

The internal combustion engine 612 may be, for example, an SI engine, a CI engine, or part of an electric motor/battery system in a hybrid vehicle. However, it is appreciated that unlike the embodiment as shown in FIG. 11, the internal combustion engine 612 is normally aspirated and not boosted (i.e., no turbo charger is included). The throttle 628 is located downstream of the air cleaner 614 and upstream of an intake manifold 642 of the internal combustion engine 612.

In the embodiment as shown in FIG. 15, the first motive inlet 332 of the evacuator 330 is fluidly connected with the fuel vapor canister 331, as represented by conduit line 642. The flow valve 616 is located within the conduit line 642. The second motive inlet 334 of the evacuator 330 is fluidly connected with the crankcase ventilation system 652, as represented by conduit line 644. Both the discharge outlets 336, 338 of the evacuator 330 are fluidly connected to the engine air system 600 at a location upstream of the intake manifold 642 and downstream of an outlet 629 of the throttle 628. A conduit line 648 may fluidly connect the first discharge outlet 336 of the of the evacuator 330 with a junction between the throttle 628 and the intake manifold 642. Similarly, a conduit line 649 may fluidly connect the second discharge outlet 338 of the of the evacuator 330 and a junction between the throttle 628 and the intake manifold 642.

Referring generally to FIGS. 11-15, the disclosed engine air systems provide a relatively simple, cost-effective approach for supplying vacuum to various devices within a vehicle. In particular, the disclosed evacuators may be used to provide a low-cost approach for providing either high suction vacuum or high suction flow rate to multiple vacuum consuming devices within a vehicle. Moreover, it is to be appreciated that the motive inlets of the disclosed evacuator may be fluidly connected to both the crankcase ventilation system and the fuel vapor canister. Thus, the engine air consumed by the crankcase ventilation system and the fuel vapor canister may be used to generate vacuum that is used by those very same systems themselves.

The embodiments of this invention shown in the drawings and described above are exemplary of numerous embodiments that may be made within the scope of the appended claims. It is contemplated that numerous other configurations of the disclosure may be created taking advantage of the disclosed approach. In short, it is the applicant's intention that the scope of the patent issuing herefrom will be limited only by the scope of the appended claims.

What is claimed is:

1. A pneumatically actuated vacuum pump for providing vacuum, comprising:
 a body defining:
  at least two converging motive sections each having an outlet end;
  at least two diverging discharge sections each having an inlet end;
  at least one Venturi gap located between the outlet ends of the at least two converging motive sections and the inlet ends of the at least two diverging discharge sections;
  a first passageway defined by one of the at least two converging motive sections, one of the at least two diverging discharge sections, and the Venturi gap, wherein the Venturi gap fluidly couples the one of the at least two converging motive sections and the one of the at least two diverging discharge sections together; and
  a second passageway defined by a remaining one of the at least two converging motive sections and a remaining one of the at least two diverging discharge sections and the Venturi gap, wherein the Venturi gap fluidly couples the remaining one of the at least two converging motive sections and the remaining one of the at least two diverging discharge sections together.

2. The pneumatically actuated vacuum pump of claim 1, further comprising at least one additional gap located downstream of the Venturi gap.

3. The pneumatically actuated vacuum pump of claim 1, wherein the body defines a housing that surrounds a portion of the at least two diverging discharge sections and contains the Venturi gap.

4. The pneumatically actuated vacuum pump of claim 3, further comprising a partitioning wall located within the housing.

5. The pneumatically actuated vacuum pump of claim 4, wherein the partitioning wall extends in a direction substantially parallel with the at least two motive inlets and the at least two discharge outlets.

6. The pneumatically actuated vacuum pump of claim 4, wherein the partitioning wall isolates a portion of the Venturi gap such that fluid may only flow from each of the at least two motive inlets to a respective one of the at least two discharge outlets.

7. The pneumatically actuated vacuum pump of claim 1, wherein three additional gaps are located downstream of the Venturi gap.

8. The pneumatically actuated vacuum pump of claim 7, wherein the Venturi gap and a selected one of the additional gaps located immediately adjacent to the Venturi gap are shaped to generate a higher suction vacuum than a remaining two additional gaps.

9. The pneumatically actuated vacuum pump of claim 8, wherein the remaining two additional gaps are shaped to generate a higher suction flow rate than the Venturi gap and the selected one of the three additional gaps located immediately adjacent to the Venturi gap.

10. A turbocharged engine air system, comprising:
at least two devices requiring vacuum;
a turbocharger having a compressor fluidly connected to an intake manifold of an engine; and
a pneumatically actuated vacuum pump of claim 1 defining at least two Venturi gaps located between each of the outlet ends of the at least two converging motive sections and the inlet ends of the at least two diverging discharge sections, and at least two suction ports in fluid communication, one each, with one of the at least two Venturi gaps;
wherein the at least two discharge sections are fluidly connected to the intake manifold of the engine at a location downstream of the compressor, and
wherein each of the at least two suction ports are fluidly connected to one of the at least two devices requiring vacuum.

11. The system of claim 10, wherein the at least two devices include a fuel vapor canister, a crankcase ventilation system, and a brake boost canister.

12. The system of claim 11, wherein one of the at least two motive sections of the evacuator is fluidly connected to the fuel vapor canister.

13. The system of claim 11, wherein one of the at least two motive sections of the evacuator is fluidly connected to the crankcase ventilation system.

14. The system of claim 11, wherein the evacuator includes four suction ports, and wherein a first suction port and a second suction port of the evacuator are both fluidly connected to the brake booster, a third suction port of the evacuator is fluidly connected to the fuel vapor canister, and a fourth suction port of the evacuator is fluidly connected to the crankcase ventilation system.

15. The system of claim 10, wherein the one of the at least two motive sections of the evacuator is fluidly connected to one of the at least two devices, and another of the at least two motive sections is fluidly connected to a remaining one of the at least two devices.

16. A normally aspirated engine air system including an engine and a throttle located upstream of an intake manifold of the engine, comprising:
at least two devices requiring vacuum; and
a pneumatically actuated vacuum pump of claim 1 defining at least two Venturi gaps located between each of the outlet ends of the at least two converging motive sections and the inlet ends of the at least two diverging discharge sections, and at least two suction ports in fluid communication, one each, with one of the at least two Venturi gaps;
wherein the at least two discharge sections are fluidly connected to the intake manifold of the engine at a location downstream of the throttle, and
wherein each of the at least two suction ports are fluidly connected to one of the at least two devices requiring vacuum.

17. The system of claim 16, wherein the at least two devices include a fuel vapor canister, a crankcase ventilation system, and a brake boost canister.

18. The system of claim 17, wherein one of the at least two motive sections of the evacuator is fluidly connected to the fuel vapor canister.

19. The system of claim 17, wherein one of the at least two motive sections of the evacuator is fluidly connected to the crankcase ventilation system.

20. The system of claim 17, wherein the evacuator includes four suction ports, and wherein a first suction port and a second suction port of the evacuator are both fluidly connected to the brake booster, a third suction port of the evacuator is fluidly connected to the fuel vapor canister, and a fourth suction port of the evacuator is fluidly connected to the crankcase ventilation system.

21. The system of claim 16, wherein the one of the at least two motive sections of the evacuator is fluidly connected to one of the at least two devices, and another of the at least two motive sections is fluidly connected to a remaining one of the at least two devices.

* * * * *